US010905993B2

(12) United States Patent
Heskett et al.

(10) Patent No.: US 10,905,993 B2
(45) Date of Patent: *Feb. 2, 2021

(54) EXHAUST GAS PURIFICATION METHOD AND SYSTEM

(71) Applicant: H & H INVENTIONS & ENTERPRISES, INC., Nelsonville, OH (US)

(72) Inventors: Steven Heskett, Nelsonville, OH (US); William O. Hunter, Nelsonville, OH (US); Vladimir Zhirov, Nelsonville, OH (US)

(73) Assignee: H & H INVENTIONS & ENTERPRISES, INC., Nelsonville, OH (US)

( * ) Notice: Subject to any disclaimer, the term of this patent is extended or adjusted under 35 U.S.C. 154(b) by 35 days.

This patent is subject to a terminal disclaimer.

(21) Appl. No.: 16/361,558

(22) Filed: Mar. 22, 2019

(65) Prior Publication Data

US 2020/0061518 A1 Feb. 27, 2020

Related U.S. Application Data

(63) Continuation of application No. 16/109,604, filed on Aug. 22, 2018, now Pat. No. 10,245,546.

(51) Int. Cl.
*B01D 53/14* (2006.01)
*B01D 53/04* (2006.01)
(Continued)

(52) U.S. Cl.
CPC ....... *B01D 53/0407* (2013.01); *B01D 47/021* (2013.01); *B01D 53/1456* (2013.01);
(Continued)

(58) Field of Classification Search
CPC .............. B01D 53/0407; B01D 53/14–1493
See application file for complete search history.

(56) References Cited

U.S. PATENT DOCUMENTS

| 1,908,782 A | 5/1933 | Pearce |
| 2,058,326 A | 10/1936 | Bour |

(Continued)

FOREIGN PATENT DOCUMENTS

| DE | 2453488 | 5/1976 |
| DE | 2738501 | 3/1979 |

(Continued)

OTHER PUBLICATIONS

Byeong-Kyu Lee , B. Raj Mohan , Seung-Hyeok Byeon , Kyung-Soo Lim & Eun-Pyo Hong (2013) Evaluating the performance of a turbulent wet scrubber for scrubbing particulate matter, Journal of the Air & Waste Management Association, 63:5, 499-506, DOI: 10.1080/10962247.2012.738626.

(Continued)

*Primary Examiner* — Cabrena Holecek
(74) *Attorney, Agent, or Firm* — Dawsey Co., LPA; David J. Dawesy

(57) ABSTRACT

A method and system for reduction of particulate and gaseous contaminants from exhaust gas including multiple gas handling systems, a mixing tank, and a mixing system that mixes unprocessed exhaust gas and system fluid, while agitating the system fluid.

20 Claims, 17 Drawing Sheets

(51) Int. Cl.
*B01F 5/12* (2006.01)
*B01D 53/64* (2006.01)
*B01F 3/04* (2006.01)
*B01D 53/75* (2006.01)
*B01F 5/10* (2006.01)
*B01D 47/02* (2006.01)
*B01D 53/79* (2006.01)
*B01D 53/50* (2006.01)
*B01D 53/30* (2006.01)
*B01F 13/02* (2006.01)
*C02F 1/24* (2006.01)

(52) U.S. Cl.
CPC ........... *B01D 53/30* (2013.01); *B01D 53/504* (2013.01); *B01D 53/64* (2013.01); *B01D 53/75* (2013.01); *B01D 53/79* (2013.01); *B01F 3/0451* (2013.01); *B01F 3/04248* (2013.01); *B01F 5/10* (2013.01); *B01F 5/108* (2013.01); *B01F 5/12* (2013.01); *B01D 53/1493* (2013.01); *B01D 2251/304* (2013.01); *B01D 2251/404* (2013.01); *B01D 2251/604* (2013.01); *B01D 2258/0283* (2013.01); *B01F 13/0294* (2013.01); *B01F 2003/04319* (2013.01); *C02F 1/24* (2013.01)

(56) References Cited

U.S. PATENT DOCUMENTS

| | | |
|---|---|---|
| 2,171,574 A | 9/1939 | Lambert et al. |
| 3,488,960 A | 1/1970 | Kirkpatrick |
| 3,616,597 A | 11/1971 | Stewart |
| 3,707,067 A | 12/1972 | Dietrick |
| 3,812,654 A | 5/1974 | Brown |
| 3,906,078 A | 9/1975 | Hausberg et al. |
| 4,065,527 A | 12/1977 | Graber |
| 4,099,375 A | 7/1978 | Inglee |
| 4,107,271 A | 8/1978 | Atsukawa |
| 4,159,712 A | 5/1979 | Kanai et al. |
| 4,163,894 A | 8/1979 | Scherer |
| 4,215,537 A | 8/1980 | Hurley |
| 4,242,084 A | 12/1980 | Jamaluddin |
| 4,344,370 A | 8/1982 | Smith et al. |
| 4,369,167 A | 1/1983 | Weir, Jr. |
| 4,557,202 A | 12/1985 | Warner |
| 4,601,645 A | 7/1986 | Schmitkons |
| 4,673,421 A | 6/1987 | Schwickert |
| 4,781,737 A | 11/1988 | Pflaumbaum |
| 4,816,042 A | 3/1989 | Olavson |
| 4,936,881 A | 6/1990 | Jorzyk et al. |
| 4,959,084 A | 9/1990 | Wolverton et al. |
| 5,082,639 A | 1/1992 | Lee et al. |
| 5,313,784 A | 5/1994 | Loving |
| 5,368,521 A | 11/1994 | Koenig |
| 5,385,443 A | 1/1995 | Dufour |
| 5,403,568 A | 4/1995 | Stowe, Jr. |
| 5,439,509 A | 8/1995 | Spink et al. |
| 5,653,944 A | 8/1997 | Shimizu et al. |
| 5,738,807 A | 4/1998 | Moon |
| 5,795,504 A | 8/1998 | Berchotteau |
| 6,112,741 A | 9/2000 | Stickford |
| 6,174,349 B1 | 1/2001 | DeSantis |
| 6,385,968 B1 | 5/2002 | Gustafsson et al. |
| 6,966,942 B2 | 11/2005 | Broadbent |
| 7,025,165 B2 | 4/2006 | Jacquemont |
| 7,025,336 B2 | 4/2006 | Wynn, II |
| 7,121,786 B2 | 10/2006 | Yonehara |
| 7,316,501 B2 | 1/2008 | Thoma |
| 7,398,963 B2 | 7/2008 | Hills |
| 7,591,988 B2 | 9/2009 | Hamalainen |
| 7,814,868 B2 | 10/2010 | Yin et al. |
| 7,841,929 B2 | 11/2010 | Spiegel |
| 8,191,869 B2 | 6/2012 | Galletta, Jr. |
| 8,337,790 B2 | 12/2012 | Welp et al. |
| 9,085,996 B2 | 7/2015 | Ponnuraj et al. |
| 2002/0064486 A1 | 5/2002 | Shimakawa |
| 2005/0159101 A1 | 7/2005 | Hrdina et al. |
| 2007/0243119 A1 | 10/2007 | Downs et al. |
| 2012/0240766 A1 | 9/2012 | Kwack |
| 2013/0025462 A1 | 1/2013 | Yun |
| 2014/0245892 A1* | 9/2014 | Hernandez Olvera ..................... B01D 47/18 96/235 |
| 2014/0349379 A1 | 11/2014 | Bachellier |
| 2015/0072393 A1 | 3/2015 | Liberman |
| 2016/0326016 A1 | 11/2016 | Park et al. |

FOREIGN PATENT DOCUMENTS

| | | |
|---|---|---|
| DE | 3221378 | 12/1983 |
| EP | 129775 | 1/1985 |
| GB | 525702 | 9/1940 |
| JP | 2002-45640 A | 2/2002 |

OTHER PUBLICATIONS

International Search Report and Written Opinion of the International Searching Authority for International Application No. PCT/US2018/051635, dated Nov. 20, 2018, ten pages.

* cited by examiner

EXHAUST GAS PURIFICATION METHOD AND SYSTEM

CROSS-REFERENCE TO RELATED APPLICATIONS

This application is a continuation of U.S. nonprovisional application Ser. No. 16/109,604, filed on Aug. 22, 2018, all of which is incorporated by reference as if completely written herein.

STATEMENT REGARDING FEDERALLY SPONSORED RESEARCH OR DEVELOPMENT

Not applicable.

TECHNICAL FIELD

The present disclosure relates generally to a system and method for reducing contaminants from exhaust gas.

BACKGROUND OF THE INVENTION

The present invention relates to a method for reduction of particulate and gaseous contaminants from exhaust gas. While much of this disclosure will refer to coal fired power plants, the present system and method is not limited to exhaust gas that is the result of the combustion of coal, and further is not limited to flue gas associated with the combustion of other fuels such as natural gas, diesel, waste oil, garbage, and the like, rather the present system and method is applicable to any exhaust gas stream from which it is desirable to remove contaminants, particularly any gas stream application that may currently utilize precipitator, scrubber, and any other, technologies to remove contaminants.

With that out of the way and now referring back to combustion exhaust gas, particulate matter carried in suspension by the effluent or waste gases from furnaces burning fossil fuels is commonly referred to as fly ash. Fly ash is an undesired by-product of coal fired power plants. The fly ash created by power plants can greatly vary depending on the type of coal used as fuel. For instance lignite coal produces Class C fly ash that is high in lime (CaO), which is commonly formed into blocks. In another example, anthracite and bituminous coals produce Class F fly ash which is naturally low in lime (CaO). As a result, power plants, and their pollution control systems, are generally designed specifically for the type of fuel used in order to adequately to reduce particulate and gaseous contaminants from the exhaust gas. In the past, the dumping of untreated power plant exhaust gas resulted in acid rain that damaged buildings and plants, introduced high concentrations of heavy metals such as mercury (Hg) and cadmium (Cd) in the environment, as well as particulate dust that covered buildings and proved hazardous to persons with respiratory problems. Due to the serious damage untreated exhaust gases have on the environment, EPA regulations have been implemented to prevent the dumping of untreated power plant exhaust gases directly into the environment. Unfortunately, power plants create large amounts of fly ash each day that must be properly disposed of. For example, a power plant with large boiler rated at 1,400,000 lb./steam/hr. typically will emit 700,000 cfm of waste gas and 140 tons of ash/day. Some plants that produce Class C fly ash turn a portion of the fly ash into cinder blocks which helps to recoup a portion of the added expense of fly ash disposal. Power plants that produce Class F fly ash, due to low lime content of the ash, a binder such as Portland cement must be added to the fly ash in order to create cinder blocks, as a consequence costing the power plant more money to dispose of the fly ash. Currently, 3 to 4% of the total capital investment goes to high-efficiency ash-collecting and handling equipment.

Due to the need to prevent damage to the environment from pollutants and fly ash emitted from power plants, almost all pulverized coal power plant boilers incorporate high efficiency exhaust gas cleaning equipment. Many factors determine collection efficiency of a power plants fly ash and other pollutants. For instance, mechanical feasibility, the footprint of the allocated land, and profitability all play a role in determining what equipment a power plant can use and the pollutant collection efficiency.

Fly ash collection equipment usage has increased as boilers are designed to use coal with higher ash content and increased output. For example, earlier power plant installations had a 90% collection efficiency requirement, whereas modern power plants have 95 to 98% fly ash and pollutant collection efficiency. Variability in fly ash characteristics complicates fly ash and pollutant collection even with the advancement of power plant furnace design and pollution collection methods.

Coal fired power plants use a plurality of methods and equipment to reduce fly ash and other pollutants from being emitted into the environment. For instance, electrostatic precipitators are commonly used to separate particulate matter from the exhaust gas. Electrostatic precipitators use a direct current high voltage to induce a charge on particles in the exhaust gas. The charge causes the particles to move towards and stick to grounded plates in the electrostatic precipitators. Unfortunately, electrostatic precipitators are only effective in removing particulate matter, such as fly ash, from the exhaust gas stream. Vertical wet scrubbers are also used to clean the exhaust gas stream of particulate matter and other pollutants. In a vertical wet scrubber, exhaust gases flow in an upwards fashion while a mist in sprayed into the exhaust gas stream. As the mist travels down the vertical wet scrubber tower, the mist collects particulate matter in the exhaust gas stream and deposits them in the bottom of the tower. Additionally, various chemical agents may be included in the mist to react with pollutants in the exhaust gas. Some of these pollutants include sulfur dioxide ($SO_2$), mercury (Hg), and other heavy metals. Such systems are illustrated in FIG. 1.

SUMMARY OF THE INVENTION

A method and system for reduction of particulate and gaseous contaminants from exhaust gas including multiple gas handling systems, a mixing tank, and a mixing system that mixes unprocessed exhaust gas and system fluid, while agitating the system fluid.

BRIEF DESCRIPTION OF THE ILLUSTRATIONS

Without limiting the scope of the as disclosed herein and referring now to the drawings and figures.

Figure 1:
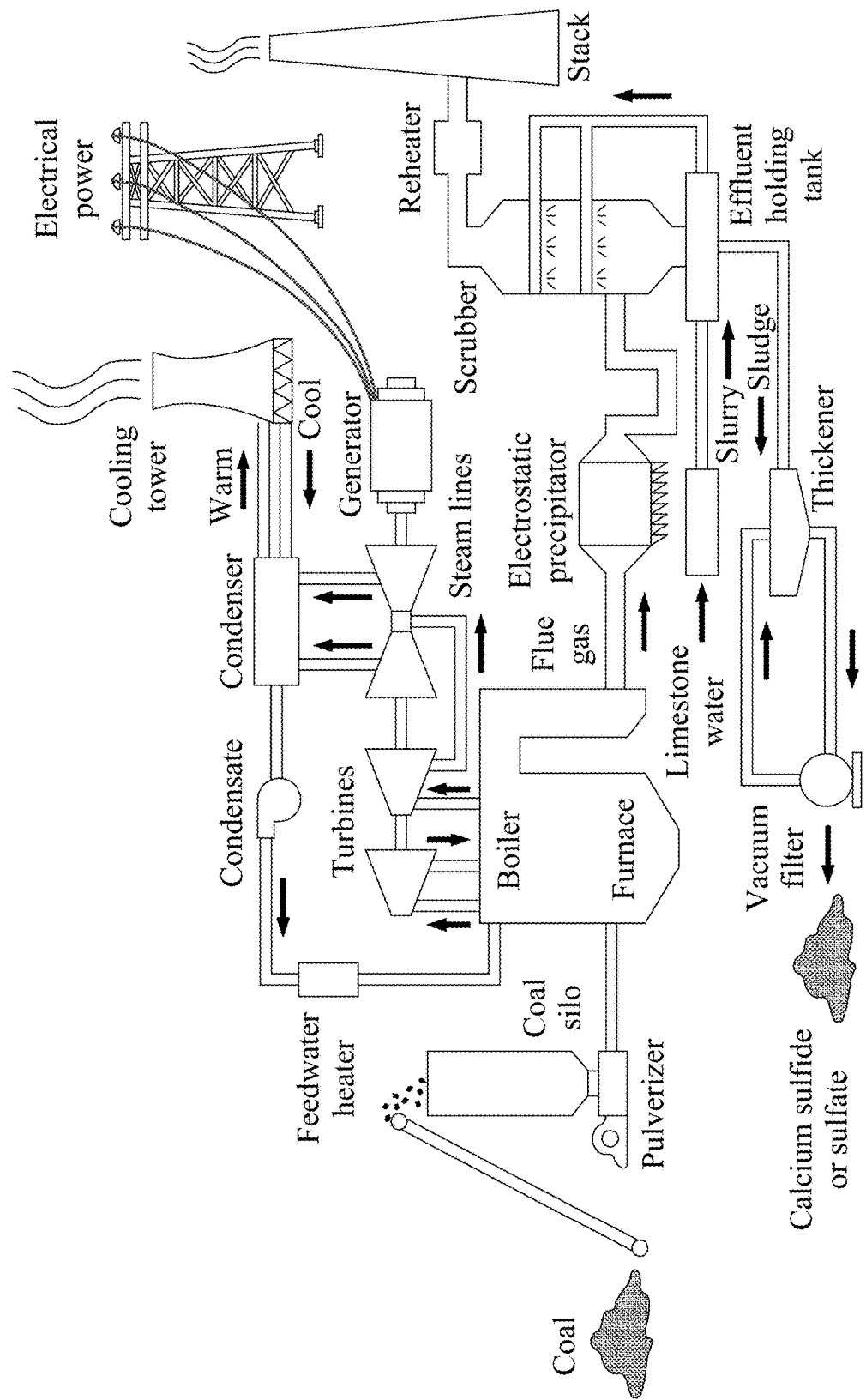
FIG. 1 is a schematic of a typical coal fired power plant.

These illustrations are provided to assist in the understanding of the exemplary embodiments of the method and system of reducing exhaust gas contaminants described in more detail below and should not be construed as unduly limiting the specification. In particular, the relative spacing, positioning, sizing and dimensions of the various elements and components illustrated in the drawings may not be drawn to scale and may have been exaggerated, reduced or otherwise modified for the purpose of improved clarity. Those of ordinary skill in the art will also appreciate that a range of alternative configurations have been omitted simply to improve the clarity and reduce the number of drawings.

DETAILED DESCRIPTION OF THE INVENTION

As seen in FIGS. 1-15, the presently disclosed method and system for reduction of particulate and gaseous contaminants from exhaust gas enables a significant advance in the state of the art. It is a new and novel method for reduction of particulate and gaseous contaminants from exhaust gas comprising conveying exhaust gas from a source (100) to a mixing tank (300). The unprocessed exhaust gas composition depends upon the fuel being burned. For instance, pulverized coal combustion flue gas will have an average constitution of: 76% $N_2$; 6% $O_2$; 11% $CO_2$; 6% $H_2O$; 1% Ar; 500-800 ppmw NOx; <1% dioxane; 0.1-1 Hg ppmw; 0.1-1 Cd ppmw; 0.5-2 other heavy metals ppmw; 5-20 g/m$^3$ of dust; and those skilled in the art likewise know the constituents of flue gases associated with other fuels such as natural gas, diesel, waste oil, garbage, and the like. The unprocessed exhaust gas composition is conveyed from the source (100) to the mixing tank (300) through a first gas handling system (200), as illustrated in FIG. 4, having a first gas handling system flowrate. The first gas handling system (200) includes a first gas handling system inlet (202) that is in communication with the source (100), and a first gas handling outlet (204) that is in communication with a mixing system (400), which is in fluid communication with the mixing tank (300). Furthermore, the first gas handling system (200) may include a first gas handling system fan (210) that insures a positive pressure of the unprocessed exhaust gases entering the mixing system (400).

The mixing tank (300) may include a mixing tank drain (310), a mixing tank drain valve (320), which may be manual or automatically controlled, and a mixing tank system fluid (330). Additionally, in one embodiment the system fluid (330) is primarily water, but may include system fluid additives containing various compounds to neutralize various chemicals commonly found in flue exhaust gases. For instance, the system fluid (330) may contain, but not limited to, hydrated lime ($Ca(OH)_2$) to neutralize sulfuric acid ($H_2SO_4$) that is formed when burning coal that has sulfur in it. Burning coal releases sulfur dioxide ($SO_2$) which reacts with water ($H_2O$) which forms sulfurous acid ($H_2SO_3$). The sulfurous acid ($H_2SO_3$) reacts further with water ($H_2O$) to form sulfuric acid ($H_2SO_4$). Lime ($Ca(OH)_2$) may be incorporated to react with the sulfur dioxide ($SO_2$) to form calcium sulfite ($CaSO_{3(s)}$) and water, as seen in the equation below.

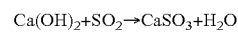

$$Ca(OH)_2 + SO_2 \rightarrow CaSO_3 + H_2O$$

In this embodiment, the calcium sulfite precipitates out of the system fluid (330) and settles in the bottom of the tank (300). Furthermore, the mixing tank drain (310) allows for the removal of precipitates and particulate from the tank (300) by opening the mixing tank drain valve (320). Again, the system fluid additive is not limited to hydrated lime ($Ca(OH)_2$), but may be one or more other chemical compounds. For instance, in further embodiments, limestone $CaCO_3$, magnesium hydroxide ($Mg(OH)_2$), and lye (NaOH) may be used to remove sulfur dioxide ($SO_2$) from the unprocessed exhaust gas. The system fluid additive(s) may be introduced into the system fluid (330) within the mixing tank (300) via an additive system (500), seen in FIG. 4, which may be as simple as a compartment within the mixing tank (300) to receive and house additives, however in another embodiment it may be an additive injection system that monitors the system fluid (330) and injects at least one additive when the additive system (500) determines that the system fluid (330) requires more additive to carry out the objectives set forth herein.

The mixing tank (300) may have mixing tank monitoring system having a liquid sensor system that monitors the amount of precipitant and other contaminants in the mixing tank (300). The sensor system may include a mixing tank fluid sensor (350) seen in FIG. 4. The sensor system is set with at least one threshold mixing tank contaminant levels, and upon at least one threshold mixing tank contaminant level being exceeded, a portion of the system fluid (330) is drained from the tank. In one embodiment the system fluid (330) is refreshed with new unreacted system fluid (330). The mixing tank fluid sensor (350) may monitor one, or more, of the following: physical precipitant levels, total dissolved solids, conductivity, specific gravity, pH level, mercury (Hg), Lead (Pb), and other heavy metal levels, as well as the temperature of the system fluid (330). In one particular embodiment the at least one threshold mixing tank contaminant level is the total dissolved solids in the system fluid (330) and is set to not exceed 15,000 mg/l, or 22,500 mmhos of conductivity.

Similarly, mixing tank monitoring system may have a gas sensor system that monitors the gas in the mixing tank (300), which may include a mixing tank gas sensor (340). The mixing tank gas sensor (340) may monitor one, or more, of the following: physical particulate levels, carbon monoxide, carbon dioxide, sulfur dioxide, and various oxides of nitrogen (NOx), as well as the temperature of the gas within the mixing tank (300). As discussed in more detail later, a mixing tank control system may be in communication with the mixing tank monitoring system and control aspects of the mixing system (400), the first GHS fan (210), the second GHS fan (610), the mixing tank drain valve (320), and/or any of the dampers or valves disclosed, or shown in the figures.

Figure 15:
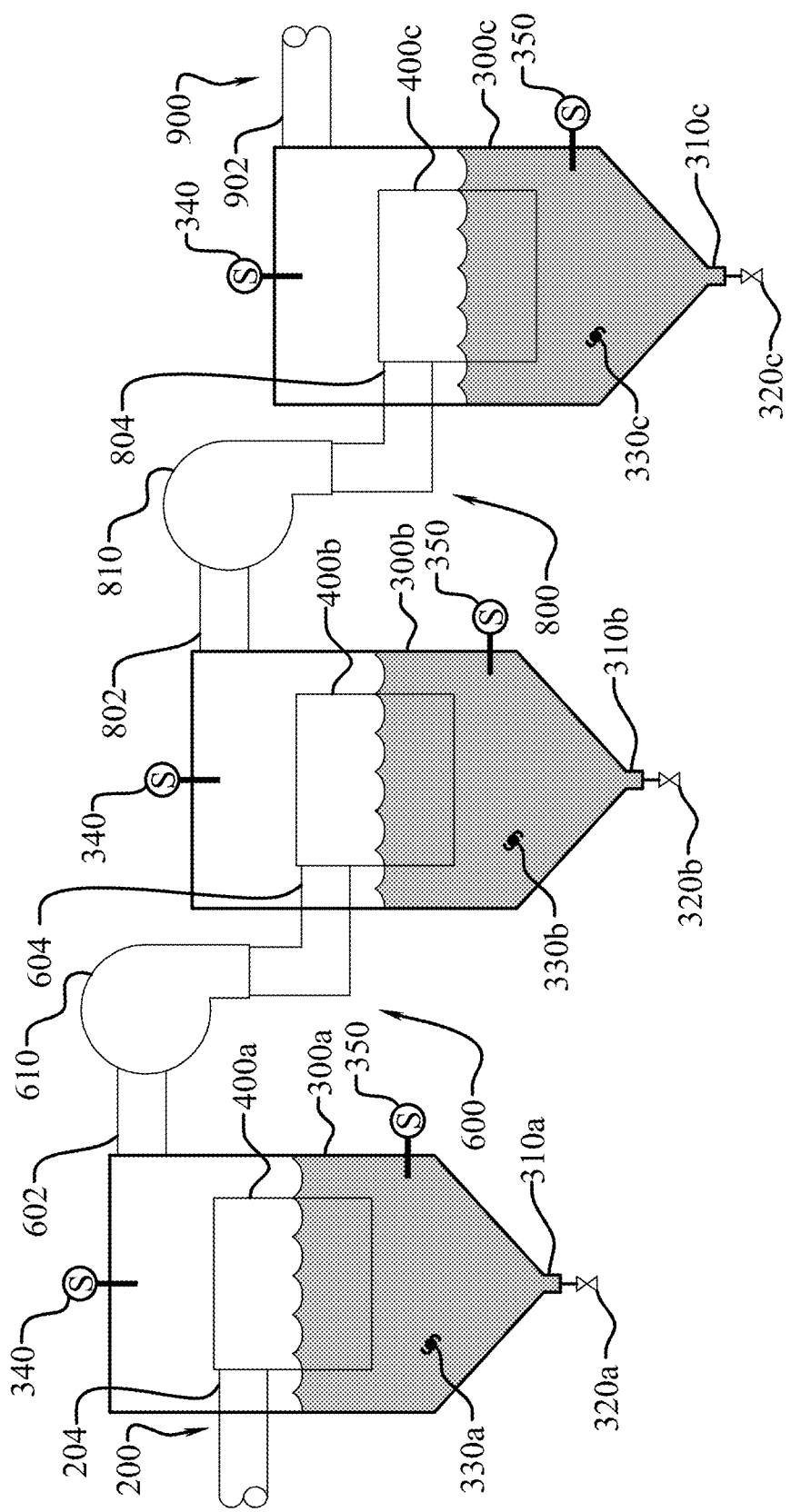
FIG. 15 is a schematic, in side elevation view, of an embodiment of the present invention.

The mixing tank (300) has a total mixing tank volume, a mixing tank liquid volume, which is the volume of the system fluid (330) contained in the mixing tank (300), and a mixing tank gas volume, which is the difference between the total mixing tank volume and the mixing tank liquid volume. Throughout the specification numerous unique relationship are disclosed, each such relationship being critical to the performance of embodiments of the system and method. In one embodiment, one such relationship is that of the first gas handling system flowrate to the mixing tank liquid volume, the mixing tank gas volume, and/or the total mixing tank volume. As will be explained in more detail later, while FIG. 4 schematically illustrates a system and method utilizing a single mixing tank (300), multiple mixing tanks (300, 300a, 300b, 300c) may be utilized in parallel, as seen in FIG. 5, or in series, as seen in FIG. 15. In the case of parallel mixing tanks (300), the first gas handling system (200) may direct the unprocessed exhaust gas to a single mixing tank (300) at a time, or alternatively multiple mixing tanks (300) simultaneously. Thus, these first series of unique relationships relate to the mixing tank liquid volume, the mixing tank gas volume, and/or the total mixing tank volume of one mixing tank (300), or multiple mixing tanks (300) if used simultaneously, used in the initial treatment of the unprocessed exhaust gas. For example with reference to FIG. 2, if only a single mixing tank (300) is used in the initial treatment of the unprocessed exhaust gas at any one time, and the others are standby mixing tanks (300) for use during the service of another mixing tank, then these disclosed relationships are only related to the volumes of a single mixing tank (300); whereas if two or three of the mixing tanks (300) are simultaneously used in the initial treatment of the unprocessed exhaust gas, then these disclosed relationships are related to the combined volumes of the simultaneously used mixing tanks (300).

Now returning to the previously mentioned relationships, in one embodiment one such relationship is that of the first gas handling system flowrate to the mixing tank liquid volume, the mixing tank gas volume, and/or the total mixing tank volume. In one embodiment the mixing tank liquid volume is at least 0.1 gallons per CFM (cubic feet per minute) of the first gas handling system flowrate; thus, a system having a first gas handling system flowrate of 10,000 CFM would have a mixing tank liquid volume of at least 1,000 gallons. In a further embodiment the mixing tank liquid volume is 0.1-5.0 gallons per CFM (cubic feet per minute) of the first gas handling system flowrate; thus, a system having a first gas handling system flowrate of 10,000 CFM would have a mixing tank liquid volume of 1,000-50,000 gallons; while in yet another embodiment the mixing tank liquid volume is 0.2-3.5 gallons per CFM (cubic feet per minute) of the first gas handling system flowrate; and in an even further embodiment the mixing tank liquid volume is 0.2-1.5 gallons per CFM (cubic feet per minute) of the first gas handling system flowrate.

In another embodiment the mixing tank gas volume is at least 0.013 cubic feet per CFM (cubic feet per minute) of the first gas handling system flowrate; thus, a system having a first gas handling system flowrate of 10,000 CFM would have a mixing tank gas volume of at least 130 cubic feet; while in another embodiment the mixing tank gas volume is at least 0.020 cubic feet per CFM (cubic feet per minute) of the first gas handling system flowrate; while in still a further embodiment the mixing tank gas volume is 0.013-0.667 cubic feet per CFM (cubic feet per minute) of the first gas handling system flowrate; and in yet another embodiment the mixing tank gas volume is 0.013-0.334 cubic feet per CFM (cubic feet per minute) of the first gas handling system flowrate. Even further, another embodiment has identified a unique relationship between the mixing tank gas volume and the mixing tank liquid volume to further improve the performance and reliability of the system and method, while also reducing the likelihood of damage to the mixing tank (300) should any of the associated systems fail. For example, in one particular embodiment the mixing tank gas volume is at least 50% of the mixing tank liquid volume, while in another embodiment the mixing tank gas volume is at least 75% of the mixing tank liquid volume, in still another embodiment the mixing tank gas volume is greater than the mixing tank liquid volume, while in yet another embodiment the mixing tank gas volume is no more than twice the mixing tank liquid volume, including no more than 150% of the mixing tank liquid volume in still a further embodiment. Such relationships are essential to allowing the mixing system (400) to safely operate for extended periods of time, at high flowrates containing high particulate loads, while achieving the effectiveness and goals described herein. In an embodiment the first gas handling system flowrate is at least 5000 cfm, while it is at least 10000 cfm in another embodiment, at least 50000 cfm in still a further embodiment, and is at least 100000 cfm in an even further embodiment. In fact, a large scale industrial embodiment of the system and method may have a first gas handling system flowrate in excess of 250000 cfm, and in a particularly large-scale embodiment it is in excess of 500000 cfm, thus one skilled in the art will appreciate that the gas handling systems described herein may incorporate multiple ducting systems and fans routing exhaust gas to large mixing tanks and mixing systems incorporated numerous pumps.

Now referring to FIG. 5, the method and system for reduction of particulate and gaseous contaminants from exhaust gas may comprise of multiple parallel mixing tanks (300). One benefit of using multiple mixing tanks (300) is that multiple mixing tanks (300) allow for continuous exhaust gas processing by redirecting the exhaust gases to a fresh mixing tank (300) when a previously used tank needs servicing, or during the system fluid (330) refreshing process. As illustrated, the method and system may utilize a first GHS fan (210) that feeds any, or all, of the parallel mixing tanks (300) with the flow controlled by motor actuated dampers, or each of the parallel mixing tanks (300) may have their own dedicated first GHS fan (210), not illustrated but easily understood by one skilled in the art. Another benefit of using multiple mixing tanks (300) is that the system has additional exhaust gas handling capacity. During times of lower electrical power consumption, the plant may not be burning as much fuel and therefor generating less exhaust gas. As such, one or more of the mixing tanks (300) can be idled to save energy. In times of high electrical consumption, all the mixing tanks (300) can be used.

In another embodiment, the method for reduction of particulate and gaseous contaminants from exhaust gas may comprise of multiple series mixing tanks (300a, 300b, 300c), as seen in FIG. 15. In this embodiment, in order to progressively scrub the exhaust gas, the exhaust gas passes through multiple mixing tanks (300a, 300b, 300c). In one variation, each mixing tank (300a, 300b, 300c) contains a system fluid additive, or chemical reagent, to target specific pollutants found in the exhaust gas. For instance, one mixing tank (300a, 300b, or 300c) may contain hydrated lime ($Ca(OH)_2$) to react with the sulfur dioxide ($SO_2$) in the exhaust gas. In the next tank the system fluid additive, or chemical reagent, it may include an oxidant like sodium chlorite ($NaClO_2$) and/or nitrogen oxide ($NO_x$) which reacts with elemental mercury (Hg) to form mercury oxide (HgO) and mercury (II) chloride ($HgCl_2$) which are captured by the system fluid (330) and precipitate within the mixing tank (300a, 300b, or 300c). The mixing tank control system may control the activation and deactivation of parallel or series mixing tanks (300a, 300b, 300c) to achieve the objectives discussed herein. For example, in an embodiment of FIG. 15, the first mixing tank (300a) may be the primary tank and the mixing tank control system may only activate subsequent mixing tanks (300b, 300c), associated mixing systems (400b, 400c), and/or associated gas handling systems and dampers, when the mixing tank fluid sensor (350) and/or mixing tank gas sensor (340) measure a value outside of a predetermined acceptable range stored in the mixing tank control system.

Figure 6:
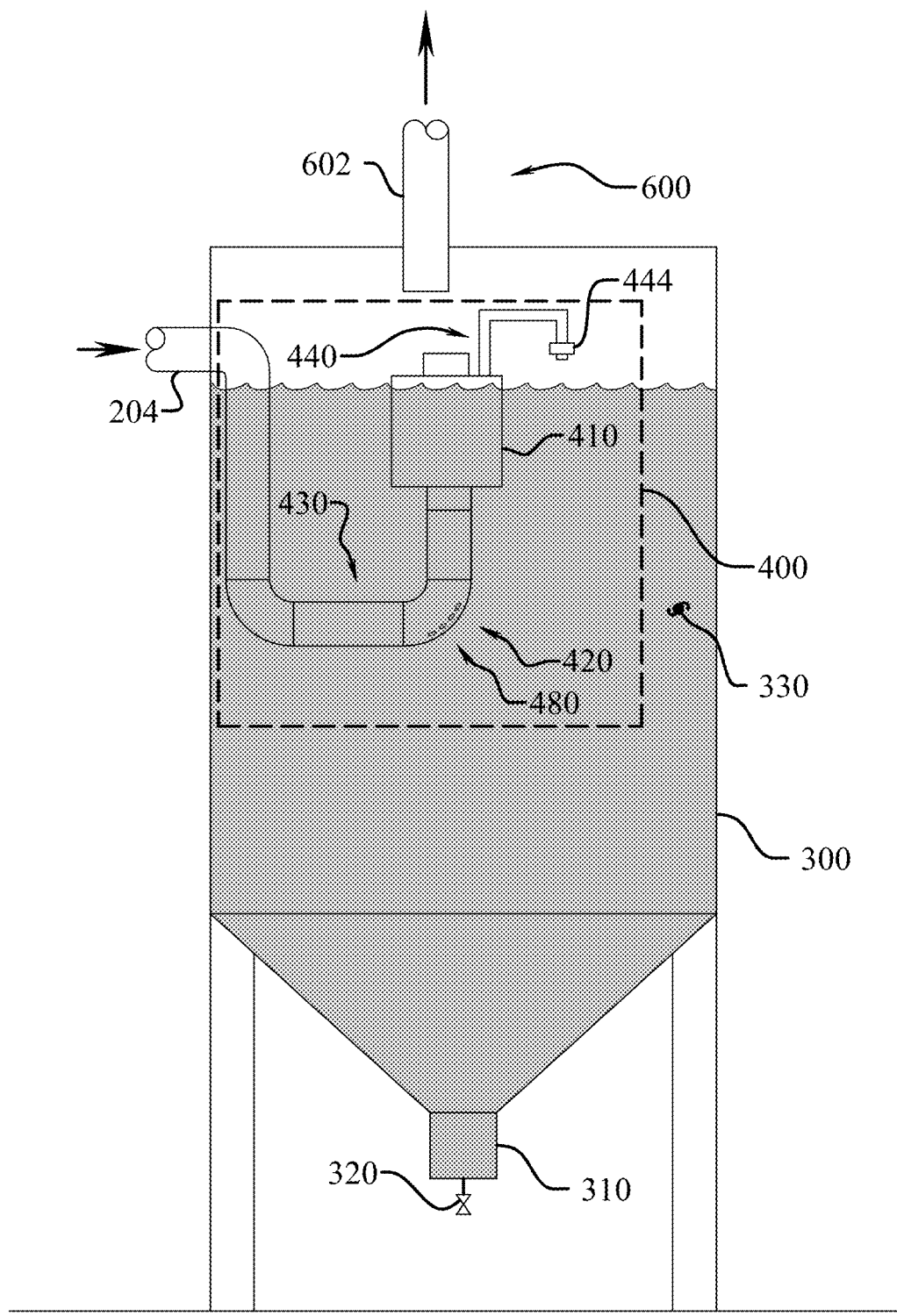
FIG. 6 is a side elevation view of an embodiment of the mixing tank and mixing system of the present invention.
Figure 7:
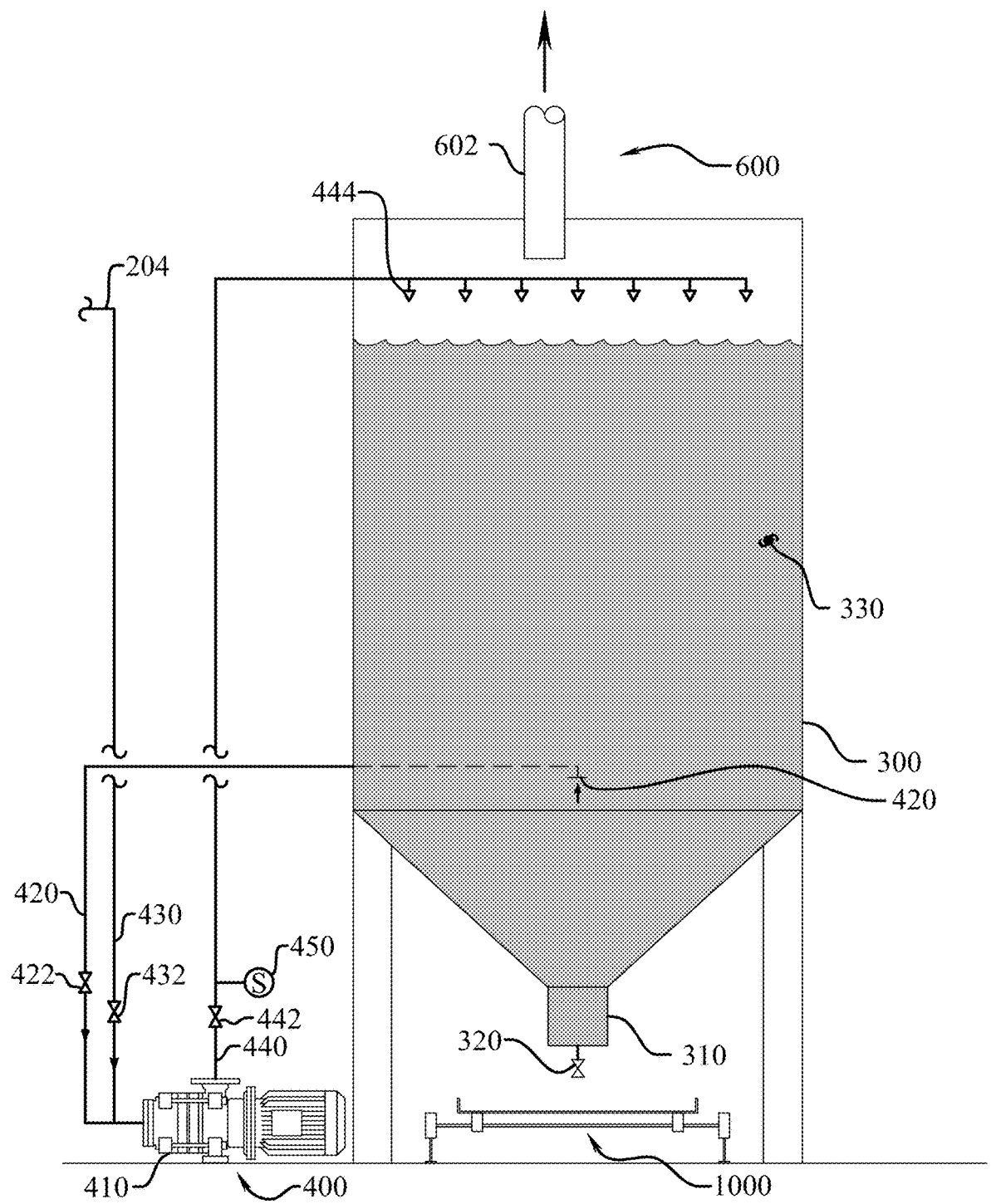
FIG. 7 is a side elevation view of an embodiment of the mixing tank and mixing system of the present invention.

Now referring to the mixing system (400) seen in FIGS. 4 and 6, the mixing system (400) selectively mixes the unprocessed exhaust gas and the system fluid (330), while agitating the system fluid (330), to remove particulate and contaminants from the unprocessed exhaust gas. The mixing system (400) may include a mixing pump (410), as seen in FIG. 7.

Others have written about the application of a turbulent contact absorber for the absorption of $SO_2$ and the simultaneous removal of fly ash in a coal-fired power plant, as well as recognizing that particles around 1 μm and below 1 (submicrometer) are present in small amounts in the total particulate mixture yet have serious impacts on human health and the environment, none have disclosed the presently disclosed unique embodiments and relationships as claimed herein, particularly the use of a mixing pump (410) to mix unprocessed exhaust gas and system fluid (330), to increase the quantity of unprocessed exhaust gas entrained in the system fluid (330), reduce the size of the entrained gas bubbles, agitate the gas entrained system fluid (330), and in some embodiments selectively spray the gas entrained system fluid (330) within the mixing tank (300). Thus, the particles that are difficult to remove using any conventional scrubbers, namely those in the 0.1 μm to 0.5 μm range, are particularly susceptible to capture using the present systems and methods having a targeted removal efficiency of 95% to 100% for particulate matter of sizes ranging from 0.1 μm to 100 μm.

A number of types of pumps are suitable for use as the mixing pump (410) provided it has the requisite capacity and can withstand the entrained gas, particulate, and temperature to which it is exposed in the present system and method. Such pumps include, but are not limited to, rotodynamic pumps, such as radial-flow pumps including centrifugal pumps, end suction pumps, horizontal split-case pumps, multi-stage pumps, multi-phase pumps, dissolved air flotation pumps, multi-volute pumps, submersible pumps, vertical turbine pumps, and axial-flow pumps; positive displacement pumps, such as rotary-type positive displacement pumps including internal gear, screw, shuttle block, flexible vane or sliding vane, circumferential piston, flexible impeller, helical twisted roots (e.g. the Wendelkolben pump), liquid-ring, lobe, and peristatic pumps; reciprocating-type positive displacement pumps including piston pumps, plunger pumps, and diaphragm pumps; and linear-type positive displacement pumps; impulse pumps; and jet pumps; just to name a few.

In some embodiments, unprocessed exhaust gas is combined with the system fluid (330) within 50 feet of the inlet to the mixing pump (410) resulting in the mixing pump (410) shearing the unprocessed exhaust gas into small bubbles, which in one embodiment results in the mixed discharge from the mixing pump (410) containing an average bubble size of less than 100 μm, while in another embodiment the average bubble size is less than 75 μm, and in still a further embodiment the average bubble size is less than 50 μm. Small bubble sizes increases the surface area of the bubbles in contact with the system fluid (300) and promotes improved particulate and contaminant capture. In yet another embodiment the unprocessed exhaust gas is combined with the system fluid (330) within 25 feet of the inlet to the mixing pump (410), and within 15 feet of the inlet to the mixing pump (410) in still a further embodiment, and within 5 feet of the inlet to the mixing pump (410) in yet another embodiment, as seen in FIGS. 6-9.

While proximity of combination and bubble size are important, so too is the percentage of exhaust gas entrained within the mixed discharge from the mixing pump (410), as low percentages of gas entrainment result in the consumption of a tremendous amount of energy to circulate enough system fluid (330) to process the exhaust gas, and lower quantities of entrained gas bubbles reduce the efficiency of removing particulate and contaminants from the exhaust gas. In one embodiment the mixed discharge exiting the mixing pump (410) contains at least 6% exhaust gas entrained in the system fluid (330), while a further embodiment has at least 8% exhaust gas entrained in the system fluid (330), and even further embodiments have at least 10%, at least 12%, at least 14%, at least 16%, and at least 18% gas entrainment. In another embodiment the mixed discharge exiting the mixing pump (410) contains 6-40% exhaust gas entrained in the system fluid (330), while a further embodiment has 8-35% exhaust gas entrained in the system fluid (330), yet another embodiment has 10-30% exhaust gas entrained in the system fluid (330), and still another embodiment has 12-25% exhaust gas entrained in the system fluid (330).

One skilled in the art will appreciate that many off the shelf entrained gas tester, or EGT, devices are commercially available to measure the percentage of entrained gas, and may do so in real-time, and may be in communication with the mixing tank control system. The control system may automatically adjust the amount of unprocessed exhaust gas drawn through at least the auxiliary flow channel (240) to achieve a target percentage of entrained gas within the mixed system fluid, and/or automatically adjust the amount of system fluid drawn through the at least one orifice (480) to achieve a target percentage of entrained gas within the mixed system fluid. Further, not all types of pumps can handle high levels of entrained gas. One particular embodiment incorporates a dissolved air flotation pump specifically designed for high levels of entrained gas, such as the HellBender DAF pump distributed by Environmental Treatment Systems, Inc. of Acworth, Ga., or the multiphase DAF pumps of Shanley Pump and Equipment, Inc. of Arlington Heights, Ill. Another embodiment incorporates a multi-volute centrifugal pump specifically designed for high levels of entrained gas, such as the LaBour TFA triple-volute centrifugal pump by Sterling Fluid Systems, Inc. of Indianapolis, Ind. All details of these referenced pumps are incorporated by reference. In one embodiment the flowrate of the mixing pump (410) is at least 0.5 gallons per minute (GPM) per CFM of the first gas handling system flowrate, while in another embodiment the flowrate of the mixing pump (410) is at least 1.0 gallons per minute (GPM) per CFM of the first gas handling system flowrate, and in yet an even further embodiment the flowrate of the mixing pump (410) is at least 2.5 gallons per minute (GPM) per CFM of the first gas handling system flowrate. In still further embodiments, the high gas entrainment and small bubble size achieves the desired effectiveness even with mixing pump (410) having a capacity of no more than 50 gallons per minute (GPM) per CFM of the first gas handling system flowrate, and no more than 25 gallons per minute (GPM) per CFM of the first gas handling system flowrate in a further embodiment, and no more than 10 gallons per minute (GPM) per CFM of the first gas handling system flowrate in still another embodiment. Thus, in light of the disclosed embodiments regarding the first gas handling system flowrate, one skilled in the art will appreciate that in some embodiments the mixing system (400) will include multiple mixing pumps (410). In a particularly effective embodiment the total capacity of the mixing pump (410), or pumps, is enough to circulate the total mixing tank liquid volume at least one every hour; while in another embodiment it circulates the total mixing tank liquid volume at least one every 45 minutes; and in still another embodiment it circulates the total mixing tank liquid volume at least one every 30 minutes. However, in another series of embodiments which further balance the need to circulate enough system fluid (330) to mix the exhaust gas, while still ensuring the settlement of captured particulate and contaminants, the total capacity of the mixing pump (410), or pumps, does not circulate the total mixing tank liquid volume more than once every minute; while in a further embodiment it does not circulate the total mixing tank liquid volume more than once every 2 minutes; while in a further embodiment it does not circulate the total mixing tank liquid volume more than once every 5 minutes.

Often general purpose centrifugal pumps can only deal with air entrainment levels of 5 to 8 percent. One skilled in the art will appreciate that cavitation and entrained gas are related but distinct issues; with entrained gas, the liquid entering the pump already has liquid and gas; in the pump it's liquid and gas; and the discharge contains liquid and gas. Conversely, with most traditional cavitation, the liquid coming into the pump is fully liquid; as soon as it hits the inlet of the pump, it starts to vaporize and comes out as liquid. In one embodiment the mixing pump (410) is a horizontal end suction pump with a Frances-vane impeller to handle the gas rich mixture and reduce the likelihood of cavitation, while another embodiment incorporates a star-shaped impeller, with extended inlet vanes and steep outlet vanes, designed to handle higher percentages of entrained gas. In another embodiment the mixing pump (410) includes an inducer to aid in handling the gas rich mixture and reduce the likelihood of cavitation; while in still another embodiment these goals are addressed through the use of a recessed impeller; and in yet another embodiment a vortex type centrifugal pump is used; while an even further embodiment utilizes a self-priming mixing pump.

Figure 2:
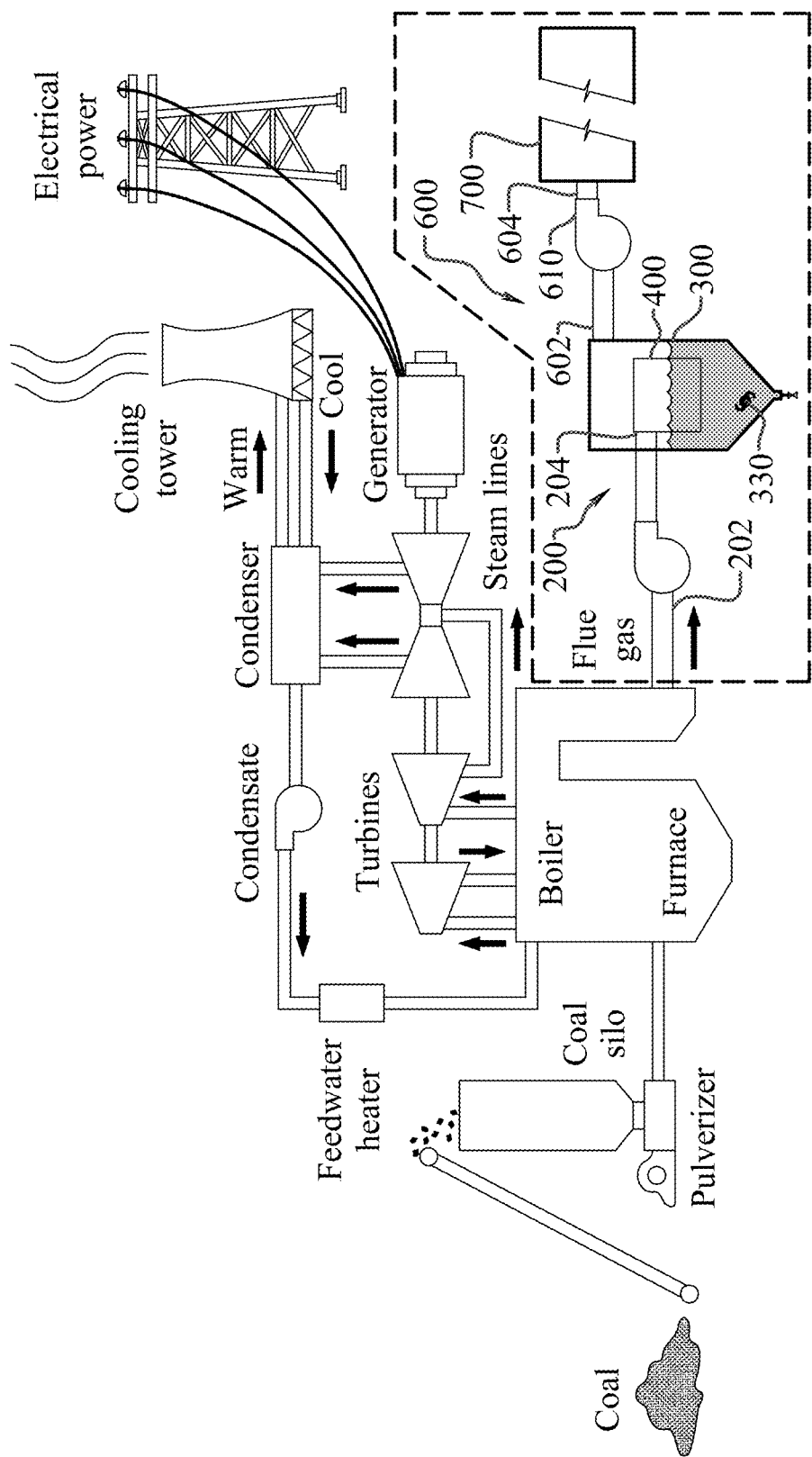
FIG. 2 is a schematic of an embodiment of a coal fired power plant incorporating aspects of the present invention.
Figure 3:
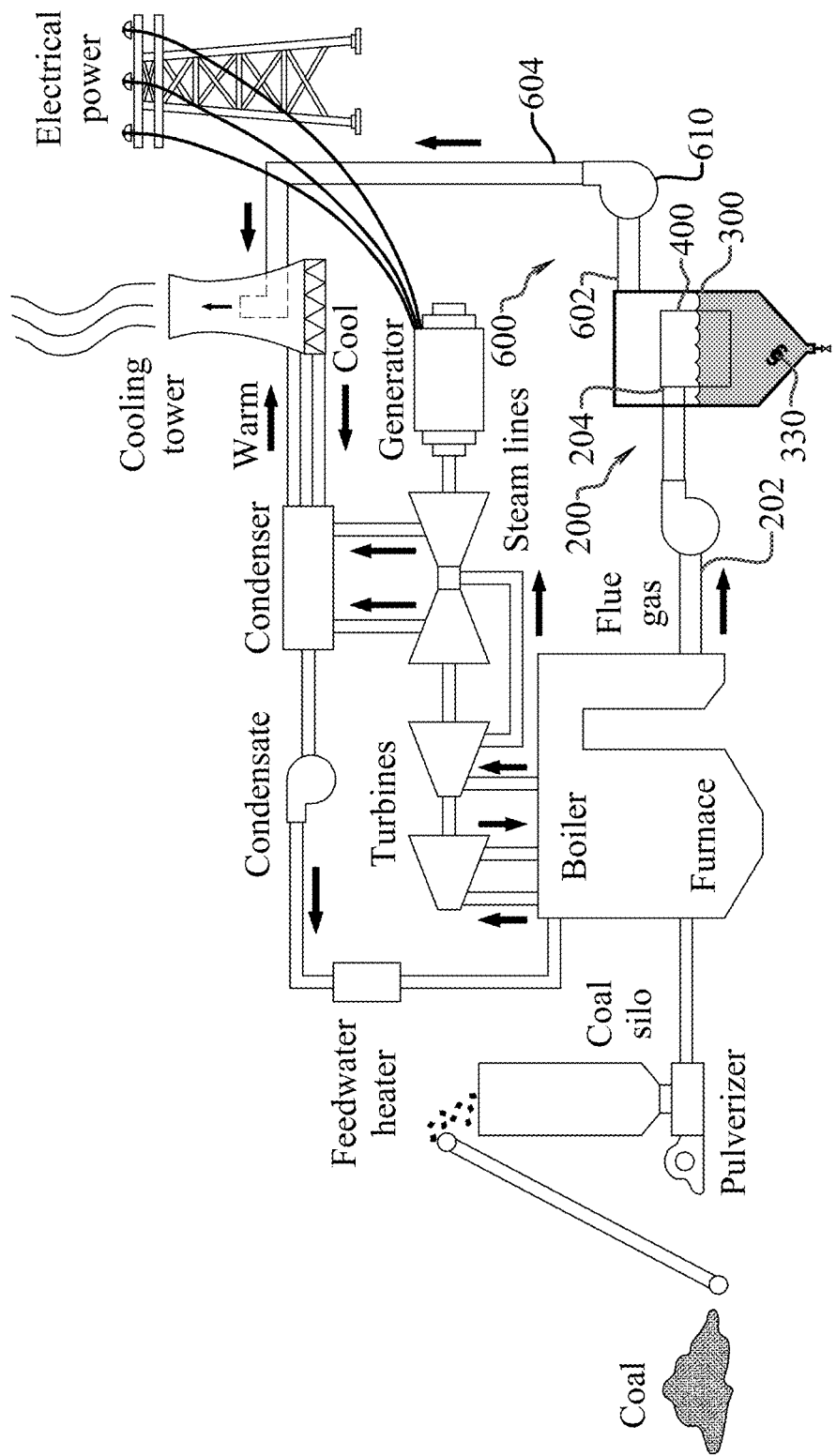
FIG. 3 is a schematic of an embodiment of a coal fired power plant incorporating aspects of the present invention.
Figure 4:
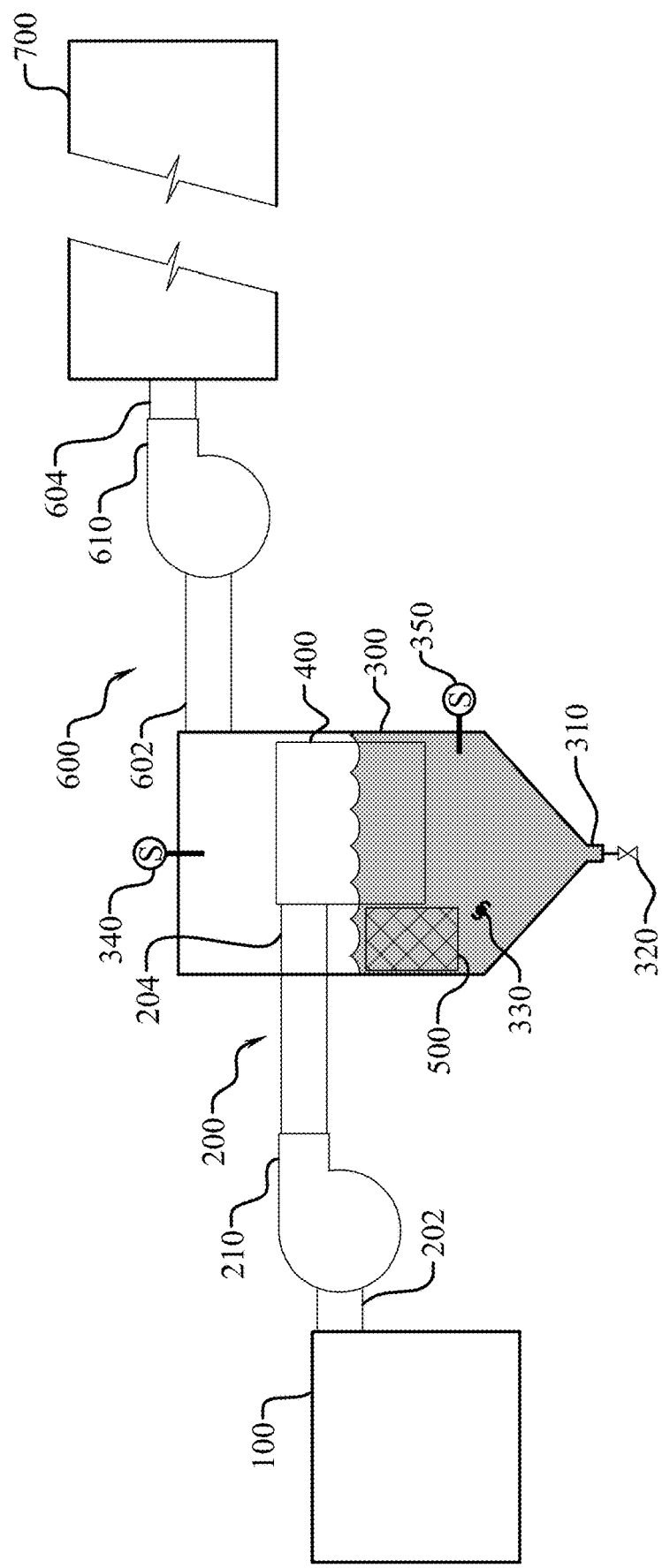
FIG. 4 is a schematic, in side elevation view, of an embodiment of the present invention.
Figure 5:
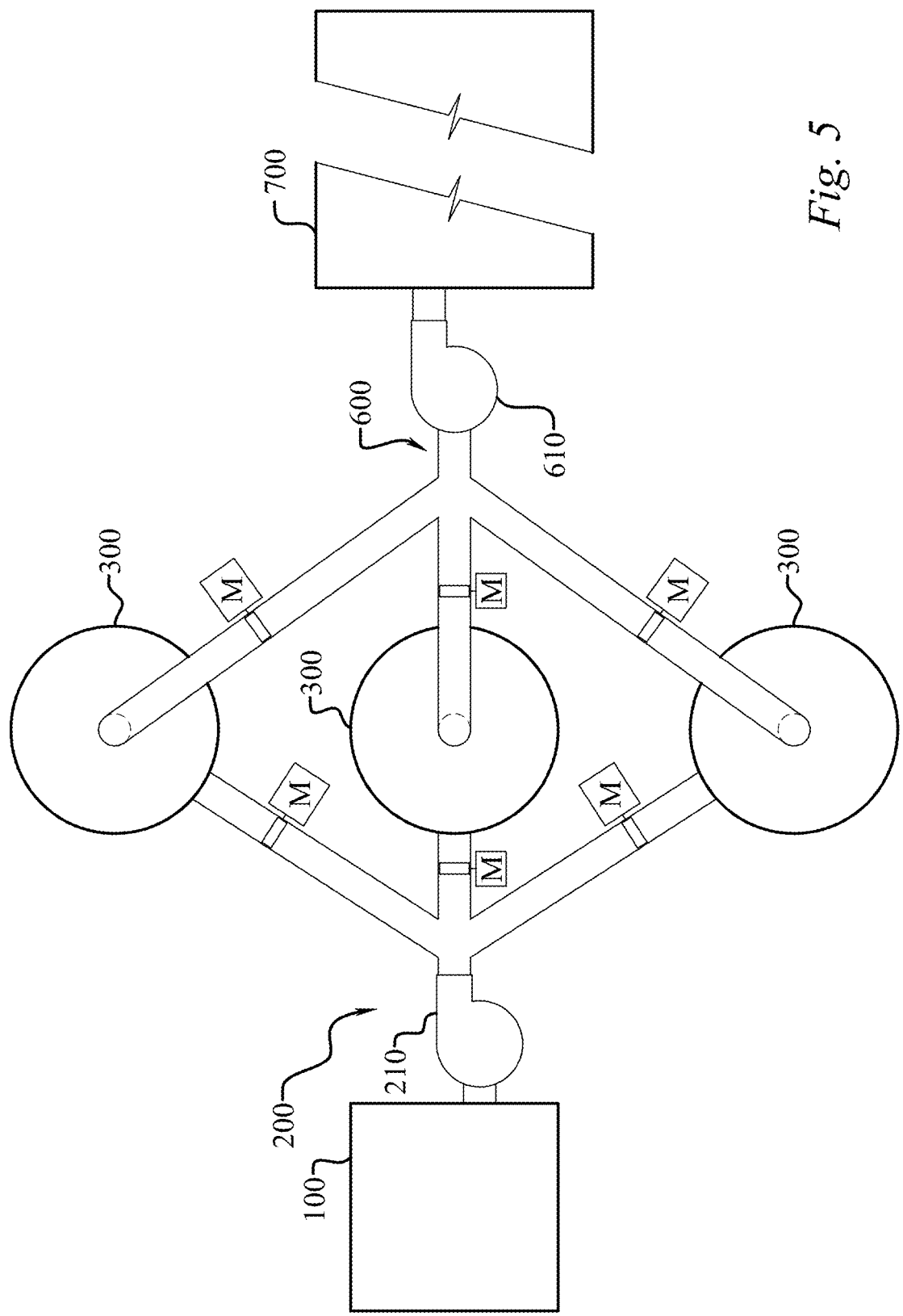
FIG. 5 is a schematic, in top plan view, of an embodiment of the present invention.
Figure 16:
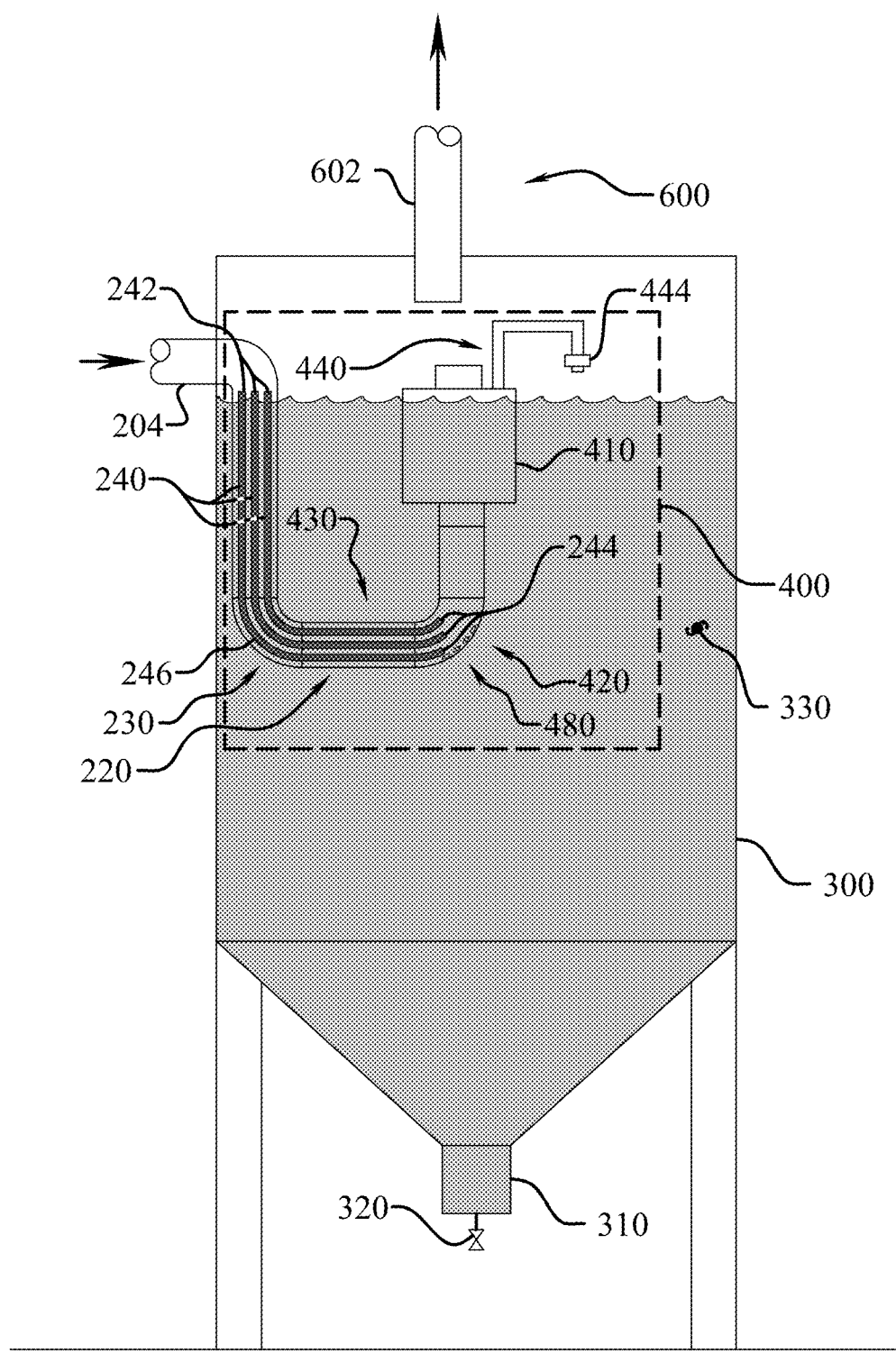
FIG. 16 is a side elevation view of an embodiment of the mixing tank and mixing system of the present invention.

The mixing system (400) is illustrated generically in FIGS. 2-4 as being within the mixing tank (300), however this is not required. A small scale test system and method are illustrated in FIGS. 6 and 16, in which the mixing system (400) is located within the mixing tank (300), however large scale implementation may require a portion of the mixing system (400) to be located external to the mixing tank (300), such as illustrated in the embodiments of FIGS. 7-9 and 17. The mixing system (400) may include a mixing pump (410) having an inlet and an outlet, wherein the inlet receives both unprocessed exhaust gas from the first gas handling system (200) and system fluid (330) of the mixing tank (300). In such embodiments the mixing pump outlet, or discharge, is in fluid communication with the mixing tank (300).

Figure 8:
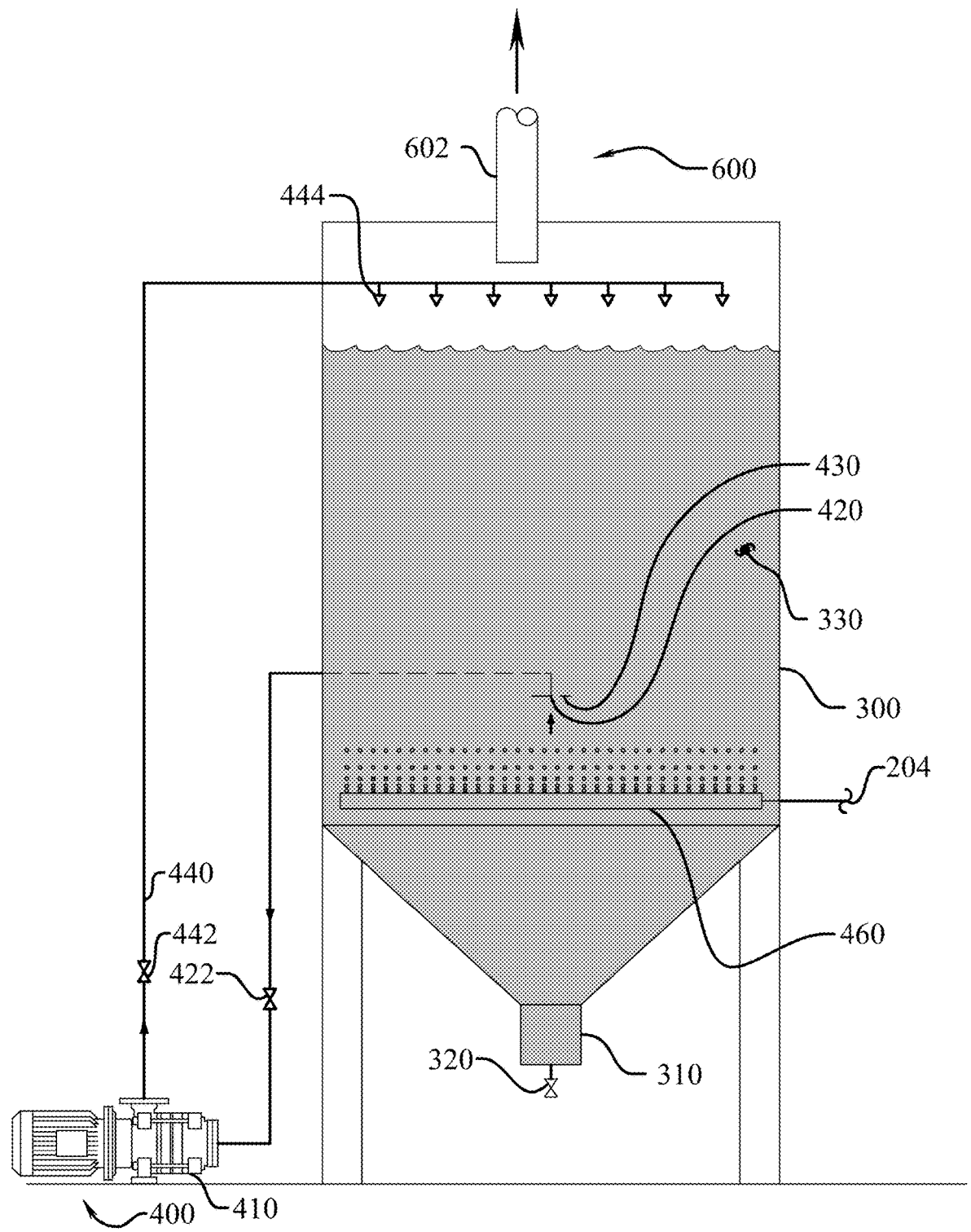
FIG. 8 is a side elevation view of an embodiment of the mixing tank and mixing system of the present invention.

The system and method of such embodiments includes the step of mixing unprocessed exhaust gas and system fluid (330) within the mixing pump (410) to create a mixed system fluid leaving the outlet and returning the mixed system fluid to the system fluid within the mixing tank (300), either above the top surface elevation of the system fluid (330), including some embodiments returning the mixed system fluid via at least one discharge nozzle (444) as seen in FIGS. 6-8, or below the top surface elevation of the system fluid (330), such as that seen in the embodiment of FIG. 9. The mixing pump inlet may be in direct fluid communication with both unprocessed exhaust gas from the first gas handling system (200) and system fluid (330) of the mixing tank (300), as seen in the embodiments of FIGS. 6 and 7 which have a pump fluid inlet (420) and a pump gas inlet (430), or it may indirectly receive the unprocessed exhaust gas and system fluid, via an pump fluid inlet (420) that is open to the system fluid (330) within the mixing tank (300) and positioned such that a portion of the unprocessed exhaust gas bubbles within the mixing tank (330) enter the pump fluid inlet (420) as seen in the embodiments of FIGS. 8 and 9.

Figure 9:
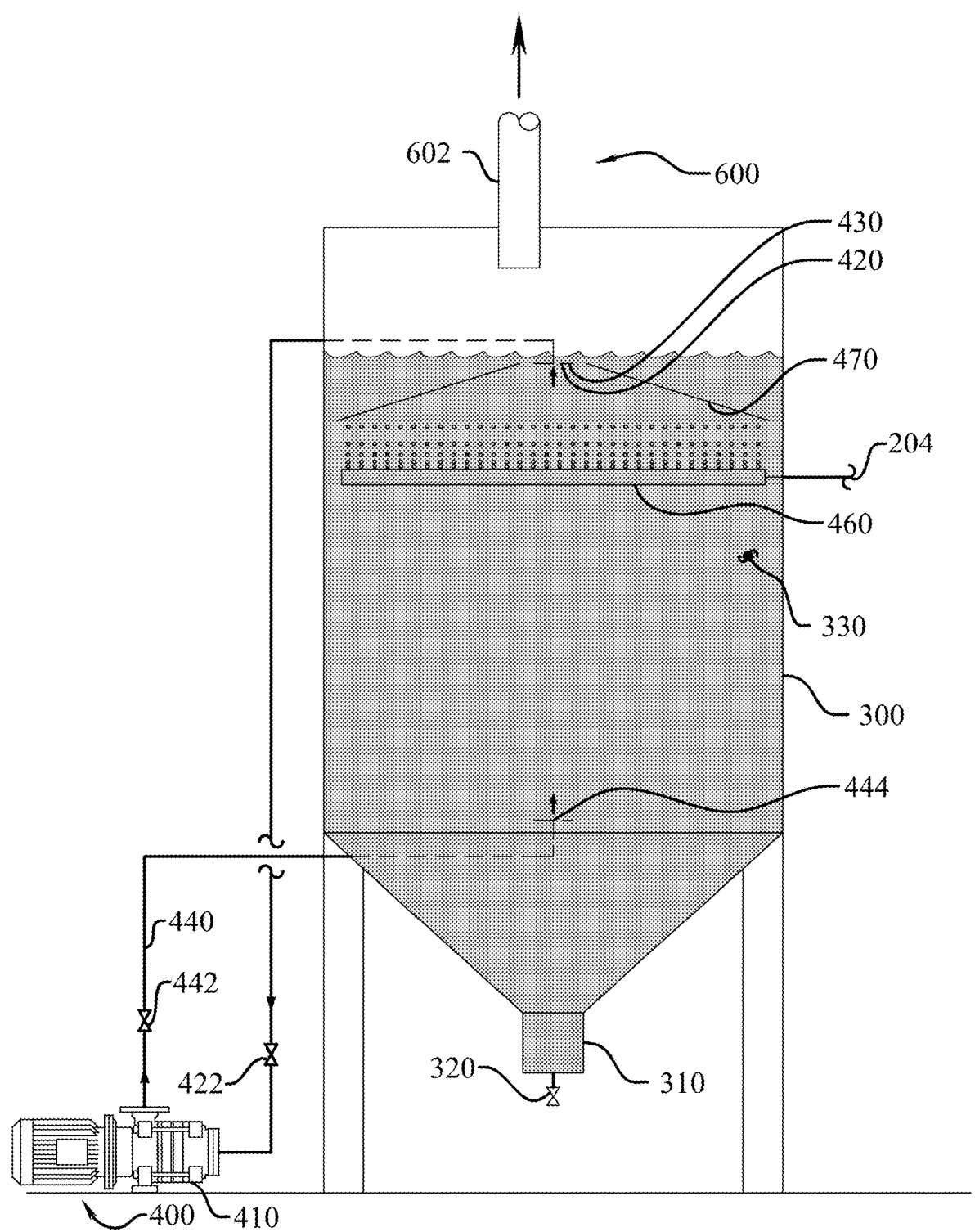
FIG. 9 is a side elevation view of an embodiment of the mixing tank and mixing system of the present invention.
Figure 10:
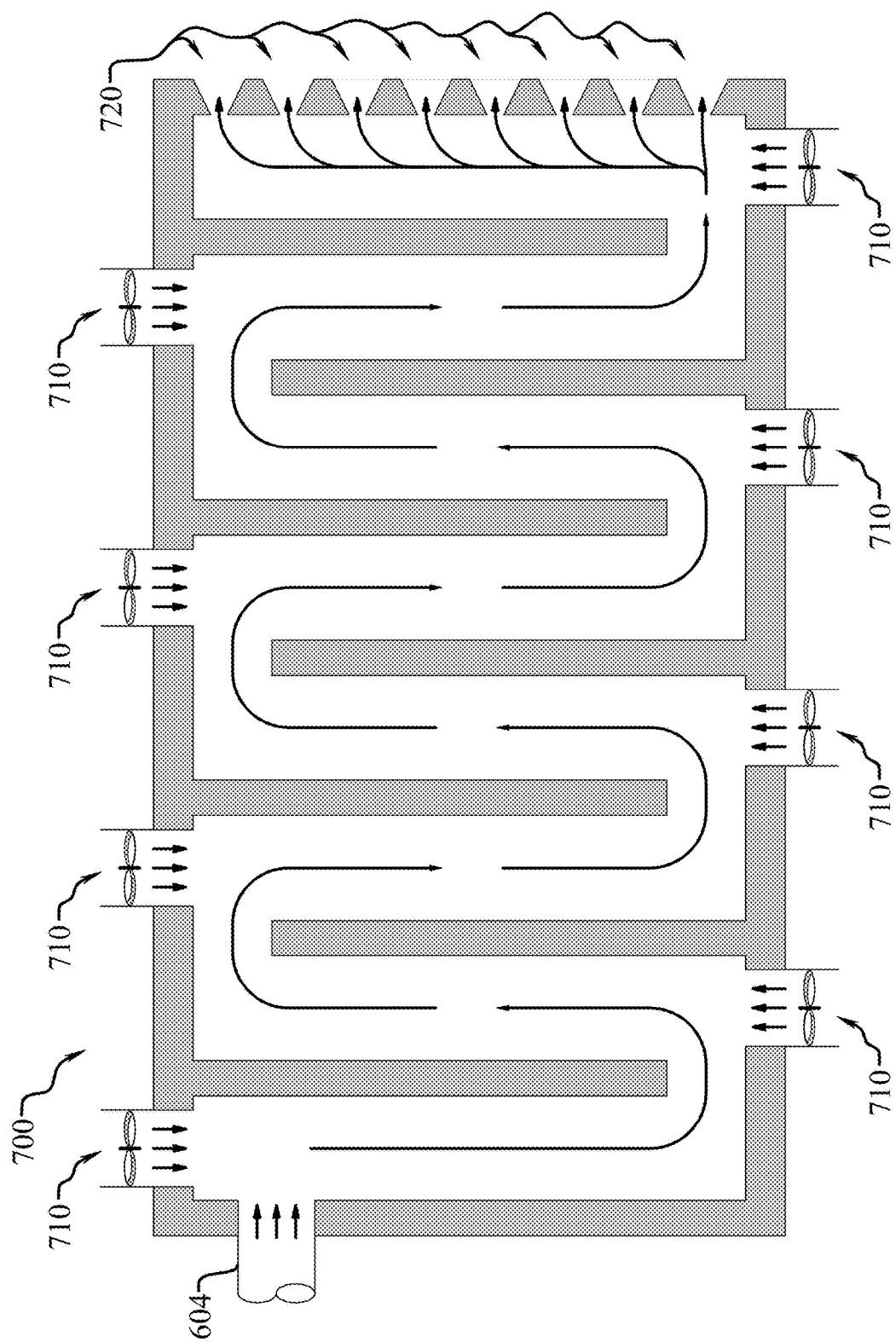
FIG. 10 is a schematic, in top plan view of a section, of an embodiment of a diffusion chamber of the present invention.

Some embodiments of the mixing system (400) include a bubble diffuser (460) within the mixing tank (300), with the bubble diffuser (460) is fluid communication with the first gas handling system (200), as illustrated in FIGS. 8 and 9. Thus, the unprocessed exhaust gas is diffused into the system fluid (330) through the bubble diffuser (460) thereby creating unprocessed exhaust gas bubbles within the system fluid (330), and the mixing pump inlet draws system fluid (330) and a portion of the unprocessed exhaust gas bubbles into the mixing pump (410). An advantage of this embodiment is that some degree of treatment of the exhaust gas is performed before it enters the mixing pump (410). Further, the mixing pump (410) performs the violent shearing and mixing of the exhaust gas bubbles and may provide the previously discussed gas entrainment ranges and bubble sizes in the mixed discharge, therefore in some embodiments the bubble diffuser (460) is a coarse bubble diffuser (460) producing ¼ to ½ inch bubbles, which reduces the cleaning and maintenance associated with the bubble diffuser (460). However, other embodiments incorporate a fine bubble diffuser (460) producing bubbles of less than ¼ inch in diameter, further increasing the surface area and treatment that occurs before entering the mixing pump (410). In fact, one embodiment incorporates a bubble diffuser (460) producing bubble diameters of less than 12 mm, while a further embodiment produces bubble diameters of less than 6 mm, and still another embodiment produces bubble diameters of less than 4 mm, and even less than 2 mm in a further embodiment. Placement of the bubble diffuser (460) within the mixing tank (300) with respect to the surface elevation of the system fluid (330) impacts the energy consumption of the system and method, and impacts the type of equipment used in the first gas handling system (200), and specifically the first GHS fan (210). Thus, in one embodiment the bubble diffuser (460) is no more than 36 inches below the surface of the mixing system fluid (330), while in another embodiment it is no more than 24 inches below the surface of the mixing system fluid (330), and in yet a further embodiment it is no more than 12 inches below the surface of the mixing system fluid (330). As illustrated in FIG. 9, in one embodiment the mixed system fluid leaving the mixing pump outlet is returned to the system fluid within the mixing tank (300) at least distance below the surface of the mixing system fluid (330) that is at least twice the distance that the bubble diffuser (460) is below the surface of the mixing system fluid (330), while in another embodiment it is at least 3 times the distance that the bubble diffuser (460) is below the surface of the mixing system fluid (330), and at least 4 times in yet another embodiment. An advantage of such embodiments is that majority of the exhaust gas passes through the mixing pump (310) more than once before reaching the surface of the system fluid (330) and leaving the mixing tank (300), further improving the efficiency and leaving more particulate and pollutants within the mixing tank (300). Further, at least one inlet guide plate (470) may be incorporated within the mixing tank (300) go gather upward rising bubbles and direct them to the mixing pump (410), further making it more difficult for bubbles to make it to the surface of the system fluid (330) and leave the mixing tank (300). The bubble diffuser (470) may consist of pipe or other outlet having a multitude of orifices located therein that allows the unprocessed exhaust gas to pass through, thereby forming small bubbles in the system fluid (330). As the unprocessed exhaust gas bubbles travel upwards through the system fluid (330) they are scrubbed of particulate matter. Furthermore, the small bubbles of exhaust gas provided sufficient surface area for various chemical reagents in the system fluid (330) to react with the sulfur dioxide and other chemicals found in the unprocessed exhaust gas. A further embodiment of the mixing tank (300) includes an impeller mixer, not shown, that further mixes and agitates the system fluid (330) in the mixing tank (300), and may force some of the bubbles towards the bottom of the tank, thereby increasing the time that the exhaust gas bubbles spend in the system fluid (330).

In another series of embodiments the mixing pump outlet is in fluid communication with at least one discharge nozzle (444) located within the mixing tank (300) at an elevation above the system fluid (330), as seen in FIGS. 7 and 8. In such embodiments the highly gas entrained mixed system fluid leaves the mixing pump (410) and is sprayed within the mixing tank (300) further scrubbing the exhaust gas before it exits the mixing tank (300), also improving the efficiency and leaving more particulate and pollutants within the mixing tank (300). In still a further embodiment, not illustrated but easily understood as a combination of the previously discussed embodiments, the mixing pump outlet is in fluid communication with both (a) at least one discharge nozzle (444) located within the mixing tank (300) at an elevation above the surface system fluid (330), and (b) a mixed system fluid discharge that is below the surface of the system fluid (330). In such an embodiment the mixing tank control system may control the percentage of the flow leaving the mixing pump (410) that returns to the mixing tank (300) via either system based upon input from the sensors.

As illustrated in FIGS. 7-9, the pump fluid inlet (420) may include a fluid inlet control valve (422), the pump gas inlet (430) may include a gas inlet control damper (432), and the pump discharge (440) may include a discharge control valve (442), all of which may be manually or automatically controlled, via the mixing tank control system, to achieve the desire exhaust gas entrainment. The system and method may further include an entrained gas sensor (450), as seen in FIG. 7, to monitor the amount of entrained gas in the mixed system fluid discharged from the mixing pump (410), and automatically adjust, via an entrainment control system or module of the mixing tank control system, the fluid inlet control valve (422) and/or the gas inlet control damper (432) to achieve the desire exhaust gas entrainment.

Referring back to the embodiment illustrated in FIG. 6, here the mixing pump inlet is direct fluid communication with both unprocessed exhaust gas from the first gas handling system (200) and system fluid (330) of the mixing tank (300). In this embodiment the first gas handling system (200) has at least one first GHS outlet (204), which is directly connected to the inlet of the mixing pump (410). In the illustrated embodiment at least one orifice (480) is incorporated in the first gas handling system (200) near the GHS outlet (204). The entry of the first gas handling system (200) into the mixing tank (300) above the elevation of the system fluid (330), and the location of the at least one orifice (480), are such that system fluid (330) cannot flood the first gas handling system (200), and operation of the mixing pump (410) draws system fluid (330) from the mixing tank (300) through the at least one orifice (480), while also drawing unprocessed exhaust gas into the mixing pump (410). One skilled in the art will appreciate that this may also be accomplished via a control valve, also referred to as a balancing valve or throttling valve, with the valve opening constituting the at least one orifice (480). The U-shaped configuration of the first gas handling system (200) within the mixing tank (300) prevents system fluid (330) from filling the first gas handling system (200) when the mixing pump (410) is not operating, and a portion of which is quickly evacuated by the mixing pump (410) upon start up. In this embodiment the discharge from the mixing pump (410) is in fluid communication with at least one discharge nozzle (444) that sprays the gas entrained mixed system fluid back into the mixing tank (300). Although illustrated as a submersible pump within the mixing tank (300), all, or portions of, the mixing system (400) may be located outside of the mixing tank (300).

Figure 17:
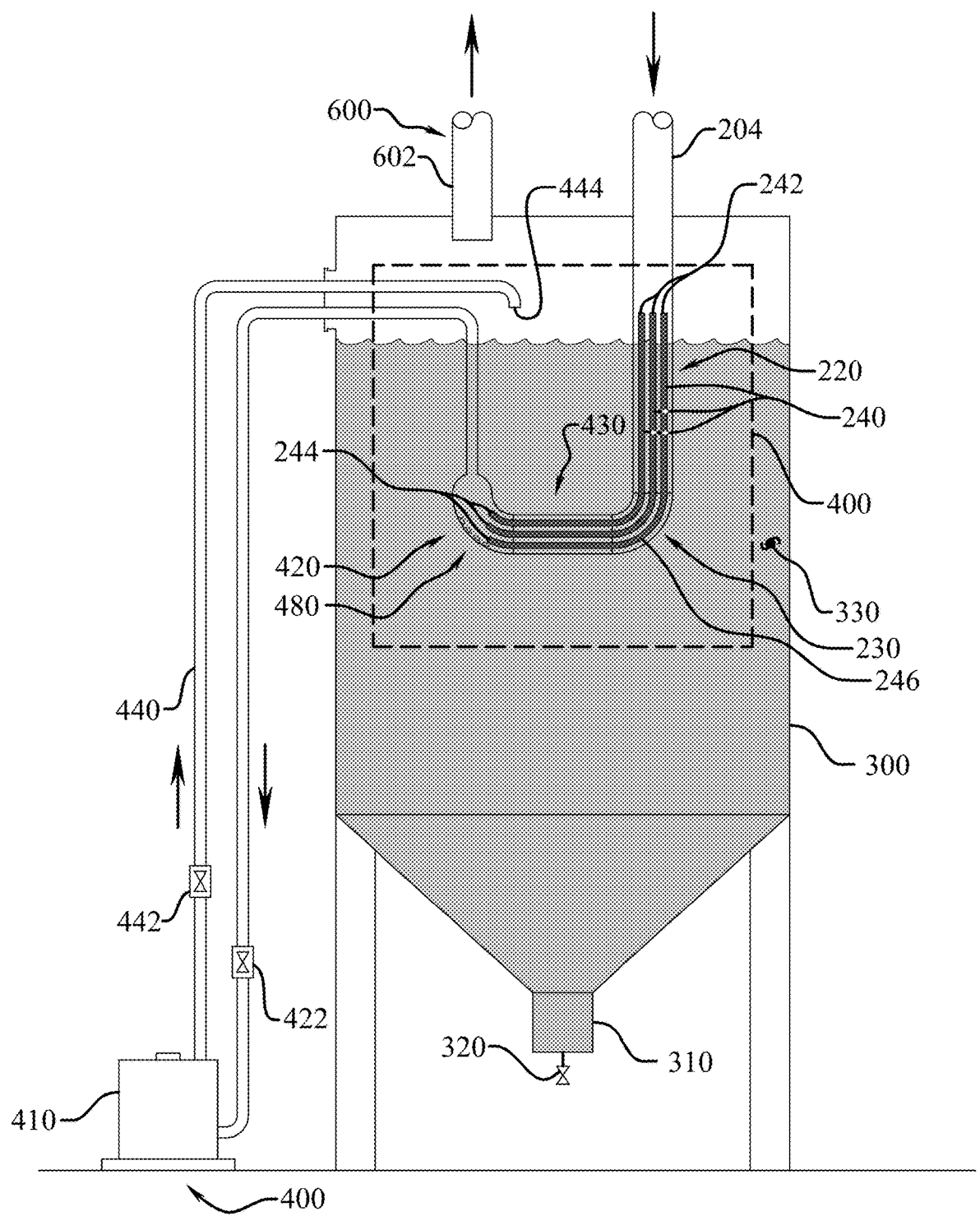
FIG. 17 is a side elevation view of an embodiment of the mixing tank and mixing system of the present invention.

In one embodiment the entry of the first gas handling system (200) into the mixing tank (300) is above the elevation of the system fluid (330), as seen in FIGS. 16-17, and includes a submerged GHS section (220) within the system fluid (330). This is beneficial for many reasons including providing a unique method of combining the unprocessed exhaust gas and the system fluid (330) prior to entry into the mixing pump (410). The submerged GHS section (220) may include a submerged GHS directional change (230), which in one embodiment changes the direction of flow by at least 45 degrees, at least 90 degrees in a further embodiment, at least 135 degrees in still another embodiment, and at least 180 degrees in yet a further embodiment. The submerged GHS section (220) may further include at least one auxiliary flow channel (240) having an auxiliary flow channel inlet (242), an auxiliary flow channel outlet (244), and in some embodiments an auxiliary flow channel directional change (246), which in one embodiment changes the direction of flow by at least 45 degrees, at least 90 degrees in a further embodiment, at least 135 degrees in still another embodiment, and at least 180 degrees in yet a further embodiment. The at least one auxiliary flow channel (240) extends within the first gas handling system (200) from the auxiliary flow channel inlet (242) at a point above the elevation of the system fluid (330) within the mixing tank (300), downward below the elevation of the system fluid (330) within the mixing tank (300), to the auxiliary flow channel outlet (244), which is positioned such that the unprocessed exhaust gas may rise and mix with system fluid (330) to either the entry to the mixing pump (410) or the transition to the pump fluid inlet (420), as seen in FIG. 17. In one embodiment the auxiliary flow channel outlet (244) is preferably located at a submerged GHS directional change (230), while in a further embodiment the auxiliary flow channel outlet (244) is preferably located adjacent to the at least one mixing system orifice (480). In a further embodiment the auxiliary flow channel outlet (244) is preferably located at an auxiliary flow channel directional change (246) of at least 30 degrees and allows the unprocessed exhaust gas to rise substantially vertically to the entry to the mixing pump (410) or the transition to the pump fluid inlet (420).

In one embodiment the at least one auxiliary flow channel (240) has a cross-sectional flow area, perpendicular to the direction of flow, that is at least 5% of a submerged GHS section (220) cross-sectional flow area, also perpendicular to the direction of flow, while in a further embodiment it is at least 10%, and at least 15% in still another embodiment. In another series of embodiments the auxiliary flow channel cross-sectional flow area is no more than 70% of the submerged GHS section cross-sectional flow area, and no more than 60% in another embodiment, and no more than 50% in still a further embodiment. The at least one orifice (480) is an opening in the submerged GHS section (220) that allows system fluid (330) to enter the submerged GHS section (220), wherein in one embodiment the at least one orifice (480) is located on the lower 180 degrees of the circumference of the submerged GHS section (220) and no orifices (480) are located on the upper 180 degrees of the circumference, thereby promoting flow within the submerged GHS section (220) that facilitates flow of the exhaust gas. Each orifice (480) has an orifice open area, or flow area, and in one embodiment that total orifice open area of all of the orifices is at least equal to the auxiliary flow channel cross-sectional flow area, while in a further embodiment the total orifice open area of all of the orifices is no more than six times the auxiliary flow channel cross-sectional flow area, while in yet a further embodiment the total orifice open area of all of the orifices is 2-4 times the auxiliary flow channel cross-sectional flow area. Even further, in another embodiment the total orifice open area of all of the orifices, in square inches, is at least 0.025 times the flowrate, in gpm, of the mixing pump (410), while in another embodiment it is 0.025-0.09, and is at least 0.040 in still a further embodiment, and 0.040-0.065 in yet another embodiment. These unique relationships and changes in flow direction ensure that upon start-up the mixing pump (410) can evacuate system fluid (330) from the auxiliary flow channel (240) and create a passageway for the unprocessed exhaust gas, and during normal operation they facilitate the creating of preferred fluid paths, reduce the risk of air locks, ensure large pockets of unprocessed exhaust gas don't damage the mixing pump, and provide appropriate proportioning to achieve the desired entrainment within the mixed discharge exiting the mixing pump (410).

As previously noted, FIG. 6 illustrates the configuration of a small scale test configuration of the system and method. In the test setup the mixing tank (300) is approximately 300 gallons, containing approximately 225 gallons of system fluid (330). The test setup included variations with a mixing pump (410) that a 30 gpm submersible pump, and a variation with a 157 gpm external pump. The unprocessed exhaust gas were generated in a source (100) consisting of a fire box burning approximately 30 pounds of bituminous coal mined in the state of Ohio. With reference now to FIG. 4, Tables 1 and 2 represent the contents of unprocessed exhaust gas in the test setup sampled at the exit of the source (100). Testing of the system fluid (330) was performed after operation of the system for several hours and revealed a sulfate concentration in the system fluid (330) of 156.7 mg/L.

TABLE 1

| | Compound | Result %, v/v | MRL %, v/v |
|---|---|---|---|
| 7727-37-9 | Nitrogen | 78.8 | 0.14 |
| 630-08-0 | Carbon Monoxide | 0.205 | 0.14 |
| 124-38-9 | Carbon Dioxide | 3.45 | 0.14 |

ND = Compound was analyzed for, but not detected above the laboratory reporting limit.
MRL = Method Reporting Limit - The minimum quantity of a target analyte that can be confidently determined by the referenced method.

TABLE 2

| | Compound | Result $\mu g/m^3$ | MRL $\mu g/m^3$ | Result ppbV | MRL ppbV |
|---|---|---|---|---|---|
| 115-07-1 | Propene | 43,000 | 690 | 25,000 | 400 |
| 75-71-8 | Dichlorodifluoromethane (CFC 12) | ND | 69 | ND | 14 |
| 74-87-3 | Chloromethane | 160 | 69 | 79 | 33 |
| 76-14-2 | 1,2-Dichloro-1,1,2,2-tetrafluoroethane (CFC 114) | ND | 69 | ND | 9.8 |
| 75-01-4 | Vinyl Chloride | 74 | 69 | 29 | 27 |
| 106-99-0 | 1,3-Butadiene | 4,300 | 69 | 2,000 | 31 |
| 74-83-9 | Bromomethane | ND | 69 | ND | 18 |
| 75-00-3 | Chloroethane | ND | 69 | ND | 26 |
| 64-17-5 | Ethanol | ND | 690 | ND | 360 |
| 75-05-8 | Acetonitrile | 780 | 69 | 470 | 41 |
| 107-02-8 | Acrolein | 900 | 270 | 390 | 120 |
| 67-64-1 | Acetone | 2,900 | 690 | 1,200 | 290 |
| 75-69-4 | Trichlorofluoromethane (CFC 11) | ND | 69 | ND | 12 |
| 67-63-0 | 2-Propanol (Isopropyl Alcohol) | ND | 690 | ND | 280 |
| 107-13-1 | Acrylonitrile | 580 | 69 | 270 | 32 |
| 75-35-4 | 1,1-Dichloroethene | ND | 69 | ND | 17 |
| 75-09-2 | Methylene Chloride | ND | 69 | ND | 20 |
| 107-05-1 | 3-Chloro-1-propene (Allyl Chloride) | ND | 69 | ND | 22 |
| 76-13-1 | Trichlorotrifluoroethane (CFC 113) | ND | 69 | ND | 8.9 |

TABLE 2-continued

| Compound | | Result µg/m³ | MRL µg/m³ | Result ppbV | MRL ppbV |
|---|---|---|---|---|---|
| 75-15-0 | Carbon Disulfide | 3,800 | 690 | 1,200 | 220 |
| 156-60-5 | trans-1,2-Dichloroethene | ND | 69 | ND | 17 |
| 75-34-3 | 1,1-Dichloroethane | ND | 69 | ND | 17 |
| 1634-04-4 | Methyl tert-Butyl Ether | ND | 69 | ND | 19 |
| 108-05-4 | Vinyl Acetate | ND | 690 | ND | 190 |
| 78-93-3 | 2-Butanone (MEK) | 790 | 690 | 270 | 230 |

Tables 3 and 4 represent the contents of diffused processed exhaust gas in the test setup sampled at the exit of the diffusion chamber (700).

TABLE 3

| | Compound | Result %, v/v | MRL %, v/v |
|---|---|---|---|
| 7727-37-9 | Nitrogen | 77.7 | 0.14 |
| 630-08-0 | Carbon Monoxide | ND | 0.14 |
| 124-38-9 | Carbon Dioxide | ND | 0.14 |

ND = Compound was analyzed for, but not detected above the laboratory reporting limit.
MRL = Method Reporting Limit - The minimum quantity of a target analyte that can be confidently determined by the referenced method.

TABLE 4

| | Compound | Result µg/m³ | MRL µg/m³ | Result ppbV | MRL ppbV |
|---|---|---|---|---|---|
| 115-07-1 | Propene | 33 | 1.9 | 19 | 1.1 |
| 75-71-8 | Dichlorodifluoromethane (CFC 12) | 2.6 | 1.9 | 0.52 | 0.39 |
| 74-87-3 | Chloromethane | ND | 1.9 | ND | 0.93 |
| 76-14-2 | 1,2-Dichloro-1,1,2,2-tetrafluoroethane (CFC 114) | ND | 1.9 | ND | 0.28 |
| 75-01-4 | Vinyl Chloride | ND | 1.9 | ND | 0.75 |
| 106-99-0 | 1,3-Butadiene | 3.9 | 1.9 | 1.8 | 0.87 |
| 74-83-9 | Bromomethane | ND | 1.9 | ND | 0.50 |
| 75-00-3 | Chloroethane | ND | 1.9 | ND | 0.73 |
| 64-17-5 | Ethanol | ND | 19 | ND | 10 |
| 75-05-8 | Acetonitrile | 3.2 | 1.9 | 1.9 | 1.1 |
| 107-02-8 | Acrolein | ND | 7.7 | ND | 3.4 |
| 67-64-1 | Acetone | 37 | 19 | 16 | 8.1 |
| 75-69-4 | Trichlorofluoromethane (CFC 11) | ND | 1.9 | ND | 0.34 |
| 67-63-0 | 2-Propanol (Isopropyl Alcohol) | ND | 19 | ND | 7.8 |
| 107-13-1 | Acrylonitrile | ND | 1.9 | ND | 0.89 |
| 75-35-4 | 1,1-Dichloroethene | ND | 1.9 | ND | 0.49 |
| 75-09-2 | Methylene Chloride | ND | 1.9 | ND | 0.55 |
| 107-05-1 | 3-Chloro-1-propene (Allyl Chloride) | ND | 1.9 | ND | 0.62 |
| 76-13-1 | Trichlorotrifluoroethane (CFC 113) | ND | 1.9 | ND | 0.25 |
| 75-15-0 | Carbon Disulfide | ND | 19 | ND | 6.2 |
| 156-60-5 | trans-1,2-Dichloroethene | ND | 1.9 | ND | 0.49 |
| 75-34-3 | 1,1-Dichloroethane | ND | 1.9 | ND | 0.48 |
| 1634-04-4 | Methyl tert-Butyl Ether | ND | 1.9 | ND | 0.53 |
| 108-05-4 | Vinyl Acetate | ND | 19 | ND | 5.5 |
| 78-93-3 | 2-Butanone (MEK) | ND | 19 | ND | 6.5 |

While the operation of the mixing system (400) significantly cools the exhaust gas, any of the embodiments disclosed may also incorporate an exhaust gas cooling system in the first gas handling system (200) to reduce the temperature of the unprocessed exhaust gas before it reaches the mixing system (400). The exhaust gas cooling system may utilize the system fluid (330) as a cooling medium, or may utilize an external cooling medium, which may be air or liquid.

During the mixing process, particulate matter and pollutants in the unprocessed exhaust gas are separated out and remain in the system fluid (330). Furthermore, various chemicals in the unprocessed exhaust gas and any system fluid additives, or chemical reagents, such as, but not limited to, hydrated lime ($Ca(OH)_2$) are violently mixed in the mixing pump (410), resulting in efficient sulfur dioxide scrubbing of the unprocessed exhaust gas. After the combination of system fluid (330) and exhaust gas passes through the mixing pump (410) the mixed system fluid exits the pump and returns to the mixing tank (300). The particulate solids and chemical precipitates stay in the system fluid (330) and settle to the bottle of the mixing tank (300) and the processed exhaust gas eventually makes its way to the upper section of the mixing tank (300). The tank settlement may then be drained and captured on a collection system (1000), such as the conveyor system (1000) illustrated in FIG. 7, which may transport the particulate to a drying bed, which may be heated, to dry and separate the materials so that they may be sold or properly disposed of.

In another embodiment of the mixing system (400), not illustrated, the mixing system (400) uses the venturi effect wherein system fluid (330) is pumped through one or more venturies creating a vacuum which draws the unprocessed exhaust gas through the one or more venturies to mix with the system fluid (300). As a result the unprocessed exhaust gas and system fluid (330) become thoroughly mixed, and may obtain the previously disclosed entrained gas and bubble properties.

In another embodiment, after the unprocessed exhaust gas passes through the mixing system (400), the now scrubbed and processed gas is conveyed to a diffusion chamber (700) by a second gas handling system (600), as seen in FIG. 4. The second gas handling system (600) includes a second gas handling system inlet (602) which is in communication with the mixing tank (300), and a second gas handling system outlet (604) in communication with the diffusion chamber (700), or a cooling tower, as seen in FIG. 3. Furthermore, the second gas handling system (600) may include a second gas handling system fan (610) having a second gas handling system flowrate, seen in FIGS. 4 and 5, which in some embodiments creates a negative pressure in portion of the mixing tank (300) above the surface of the system fluid (330), and moves the processed exhaust gas from the mixing tank (300) to the diffusion chamber (700), which in some embodiments is a cooling tower.

The diffusion chamber (700) replaces the function of an exhaust stack commonly found in power plants. Traditionally, exhaust stacks deliver the exhaust gas into a high elevation in relation to the ground level. This allows the exhaust gases to mix with air in the atmosphere and disperse. The diffusion chamber (700) replaces the exhaust gas stack with a large enclosed space that may include a baffling system and fans to introduce fresh atmospheric air into the diffusion chamber (700). As the processed exhaust gas enters the diffusion chamber (700) from the second gas handling system (600), the exhaust gas is diluted and cooled. In some embodiment the diffusion chamber (700) includes at least one diffusion chamber fan (710), seen in FIG. 10, introducing fresh atmospheric air, at a fresh air flowrate, into the diffusion chamber (700) to mix with the processed exhaust gas. In one particular embodiment the fresh air flowrate is at least 5 times the second gas handling system flowrate, while in another embodiment the fresh air flowrate is at least 10 times the second gas handling system flowrate, while in still another embodiment the fresh air flowrate is at least 20 times the second gas handling system flowrate. In another embodiment the fresh air flowrate is at least 5 times the first gas handling system flowrate, while in another embodiment the fresh air flowrate is at least 10 times the first gas handling system flowrate, while in still another embodiment the fresh air flowrate is at least 20 times the first gas handling system flowrate. The diffusion chamber (700) also has a diffusion chamber volume, which is the internal volume of the flow path from the entrance to the exit measured in cubic feet. In one embodiment the diffusion chamber volume is at least 1 cubic foot for every cubic feet per minute (CFM) of the second gas handling system flowrate, while in another embodiment the diffusion chamber volume is at least 2 cubic feet for every CFM of the second gas handling system flowrate, and in yet a further embodiment the diffusion chamber volume is at least 5 cubic feet for every CFM of the second gas handling system flowrate. In one embodiment the diffusion chamber volume is at least 1 cubic foot for every cubic feet per minute (CFM) of the first gas handling system flowrate, while in another embodiment the diffusion chamber volume is at least 2 cubic feet for every CFM of the first gas handling system flowrate, and in yet a further embodiment the diffusion chamber volume is at least 5 cubic feet for every CFM of the first gas handling system flowrate. In still another series of embodiments the diffusion chamber volume is at least 1 cubic foot for every cubic feet per minute (CFM) of the fresh air flowrate, while in another embodiment the diffusion chamber volume is at least 2 cubic feet for every CFM of the fresh air flowrate, and in yet a further embodiment the diffusion chamber volume is at least 5 cubic feet for every CFM of the fresh air flowrate.

Figure 12:
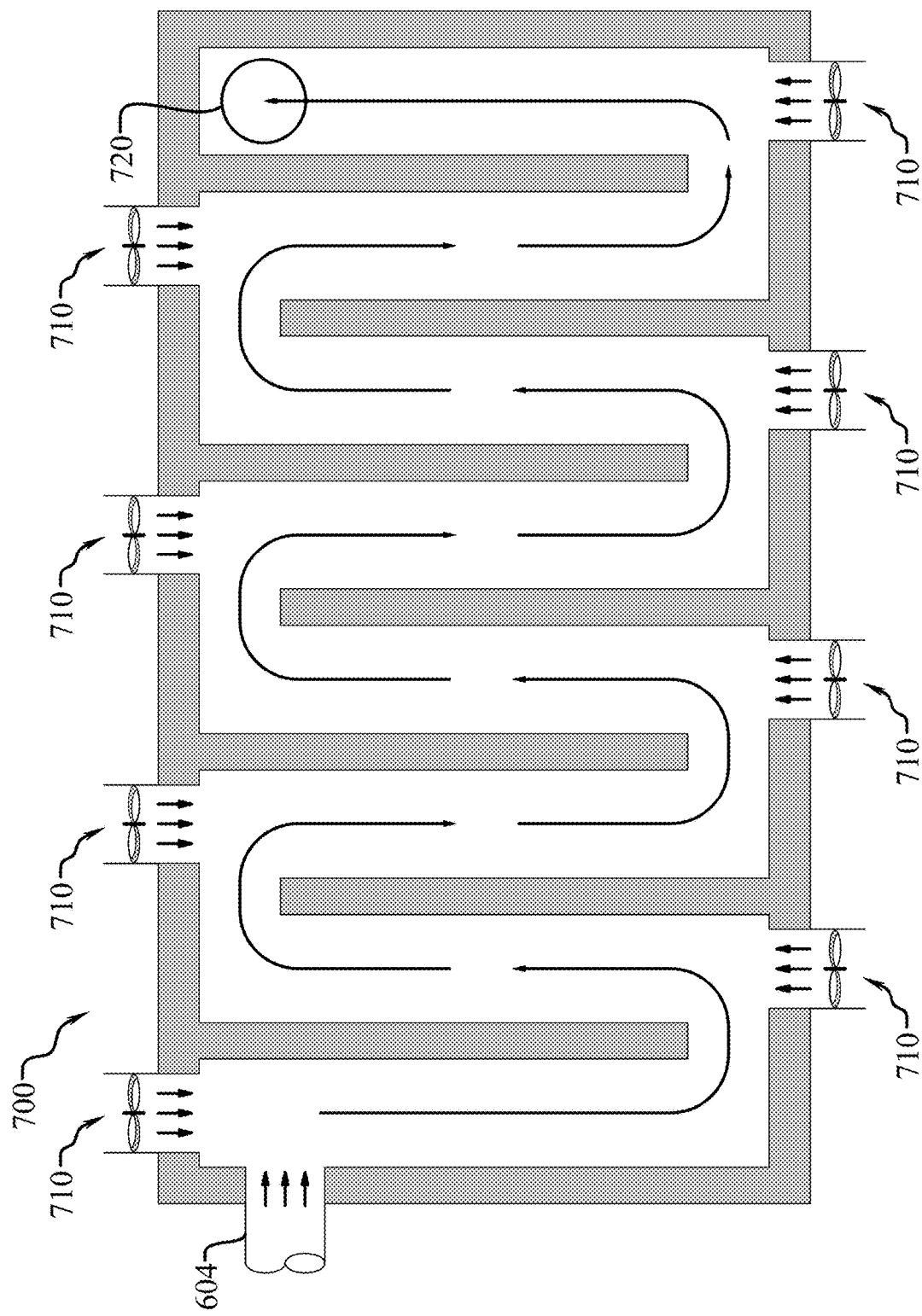
FIG. 12 is a schematic, in top plan view of a section, of an embodiment of a diffusion chamber of the present invention.
Figure 13:
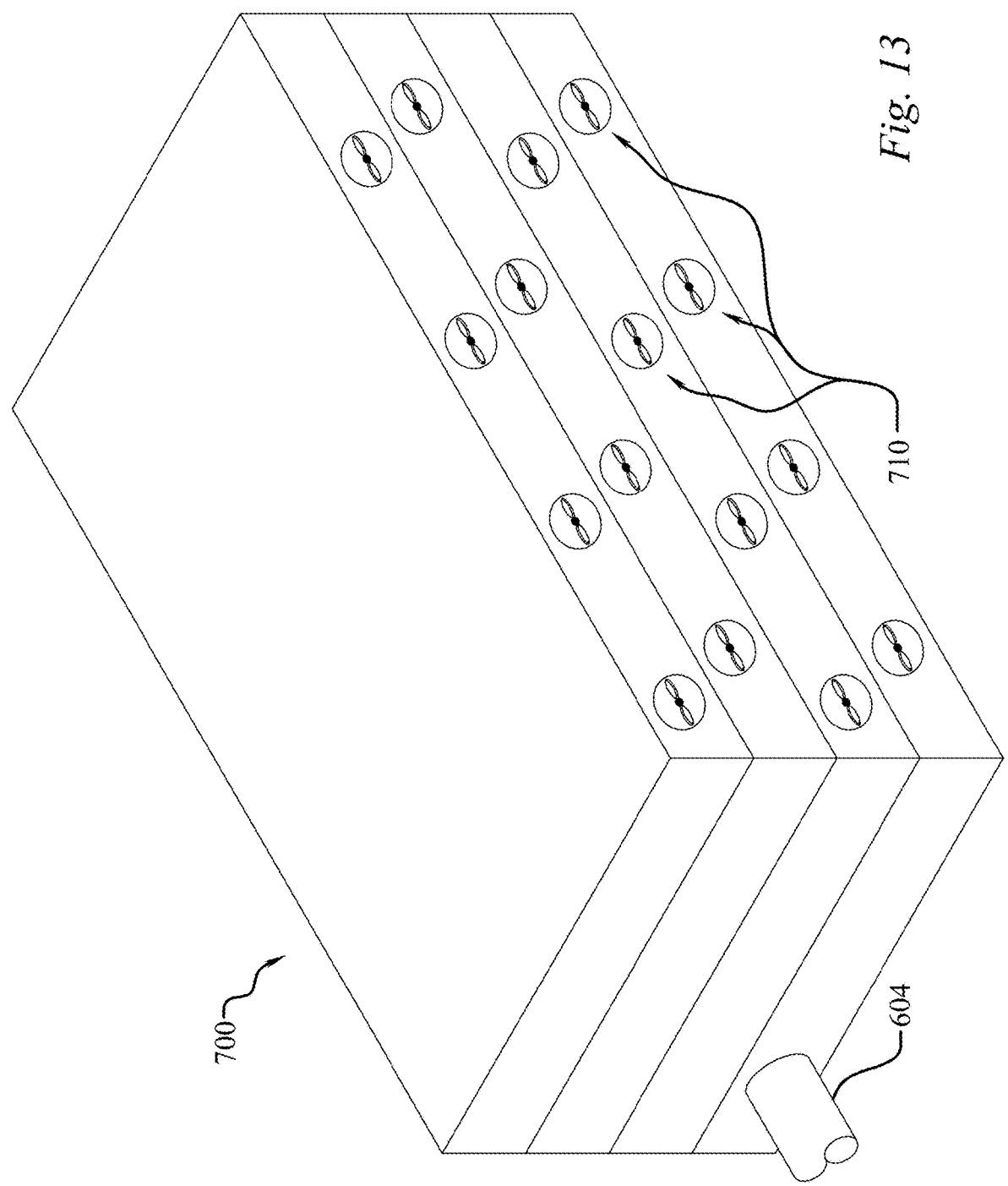
FIG. 13 is an isometric view of an embodiment of a diffusion chamber of the present invention.

The diffusion chamber (700) may incorporate a flow path that requires numerous changes in direction. In fact, in one embodiment the diffusion chamber (700) requires at least two ninety degree changes in direction, while in a further embodiment requires at least two 180 degree changes in direction, while an even further embodiment incorporates a multi-level routing so that the exhaust gas must pass through a first level to exit and exhaust gas outlet aperture (720) leading to at least on additional level requiring a similar air path, as seen in FIGS. 12 and 13. In some embodiments each level is capable of being isolated so all levels are not utilized during periods of low load, which may be controlled manually or automatically by a diffusion chamber control system. In still a further embodiment a one diffusion chamber fan (710) introduces fresh air at one or more of the changes in direction to assist in diffusing the exhaust gas and moving the exhaust gas through the diffusion chamber (700), while in a further embodiment a diffusion chamber fan (710) introduces fresh air at each of the changes in direction. The diffusion chamber (700) may further include at least one static mixing device in the flow path to further mix the exhaust gas and fresh air, and reduce stratification within the diffusion chamber (700), which in some further embodiments is accomplished via in-line fans located within the flow path. A benefit of the diffusion chamber (700) is that it permits the discharge of the exhaust gas at significantly lower elevations than traditional exhaust stacks. In fact, in one embodiment the discharge from the diffusion chamber (700) is at an elevation of less than 100 feet above the adjacent ground level, while in a further embodiment the discharge elevation is less than 75 feet, and less than 50 feet in still a further embodiment, and less than 25 feet in a final embodiment.

Figure 14:
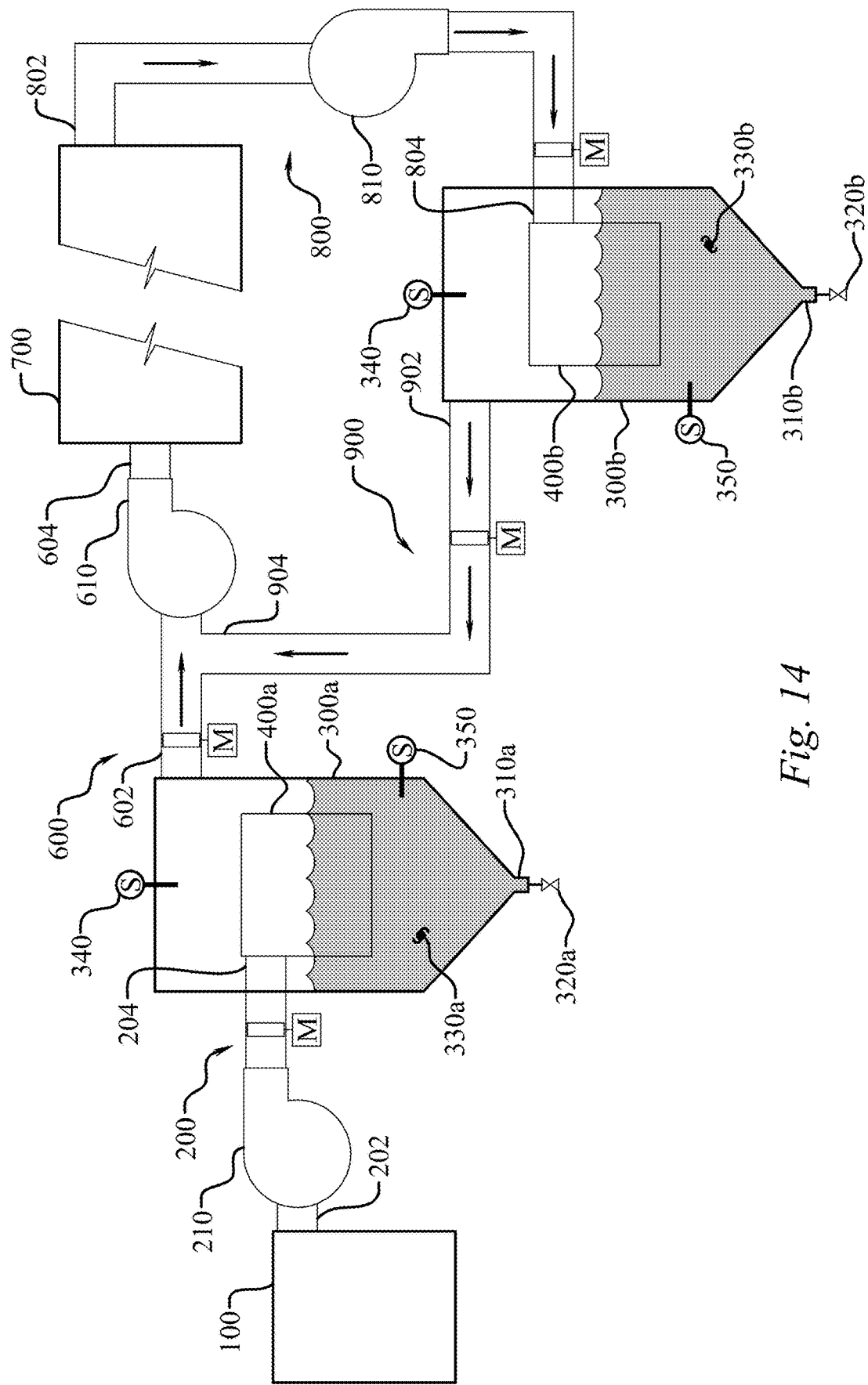
FIG. 14 is a schematic, in side elevation view, of an embodiment of the present invention.

The unprocessed exhaust gas enters the mixing system (400) at an unprocessed exhaust gas temperature, and the processed exhaust gas leaves the mixing tank (300) at a processed exhaust gas temperature. In one embodiment the processed exhaust gas temperature is less than 75% of the unprocessed exhaust gas temperature, while in a further embodiment the processed exhaust gas temperature is less than 50% of the unprocessed exhaust gas temperature. Additionally, in another embodiment the discharge from the diffusion chamber (700) is cooled to a discharge gas temperature of no more than 300 degrees Fahrenheit, and no more than 200 degrees Fahrenheit in another embodiment, and no more than 150 degrees Fahrenheit in still a further embodiment. In some embodiments the discharge gas temperature is no more than 40% of the unprocessed gas temperature, and not more than 30% of the unprocessed gas temperature in another embodiment, and not more than 20% of the unprocessed gas temperature in still a further embodiment. The diffusion chamber (700), and any of the gas handling systems, may include sensors to monitor any, or all, of the following: carbon monoxide, lead, ground-level ozone, nitrogen dioxide, particulate matter, sulfur dioxide, and temperature. If the pollutants exceed acceptable levels the fresh air flow maybe increased to further dilute the exhaust gas, and/or part of the exhaust gas may be recirculated back to a secondary mixing system (400b) for further scrubbing, as illustrated in FIG. 14 which incorporates a third gas handling system (800) having a third GHS inlet (802) in communication with the diffusion chamber (700), a third GHS outlet (804) in communication with second mixing tank (300b), and a third GHS fan (810) to transfer exhaust gas from the diffusion chamber (700) to the second mixing tank (300b), as well as a fourth gas handling system (900) having a fourth GHS inlet (902) in communication with the second mixing tank (300b), and a fourth GHS outlet (904) in communication with the second gas handling system (600). In some embodiments the fourth gas handling system (900) may incorporate a fourth gas handling system fan, not shown, to aid in returning exhaust gas from the second mixing tank (300b) to the second gas handling system (600). Alternatively, in series mixing tank embodiments, the second gas handling system (600) may transfer exhaust gas from one mixing tank (300a) to another mixing tank (300b), while in a further embodiment the third gas handling system (800) may transfer exhaust gas from the second mixing tank (300b) to a third mixing tank (300c), and so forth; with the embodiment of FIG. 15 then having the fourth gas handling system (900), analogous to the second gas handling system (600) in FIG. 4, then transferring exhaust gas to the diffusion chamber (700) or cooling tower.

The system and method may include a diffusion chamber control system that modulates the fresh air flowrate, either by turning on and off, or modulating, the at least one diffusion chamber fan (710) in response to any of the disclosed sensors to achieve the desired discharge conditions, as well as the dampers and fans of the third gas handling system (800) and fourth gas handling system (900) in recirculating embodiments, such as that of FIG. 14, or series mixing tank embodiments, such as that of FIG. 15. The diffusion chamber control system may be programmed to record and adjust operating parameters of the system and method to meet the limits defined in the National Ambient Air Quality Standards (NAAQS) for six principal pollutants.

Figure 11:
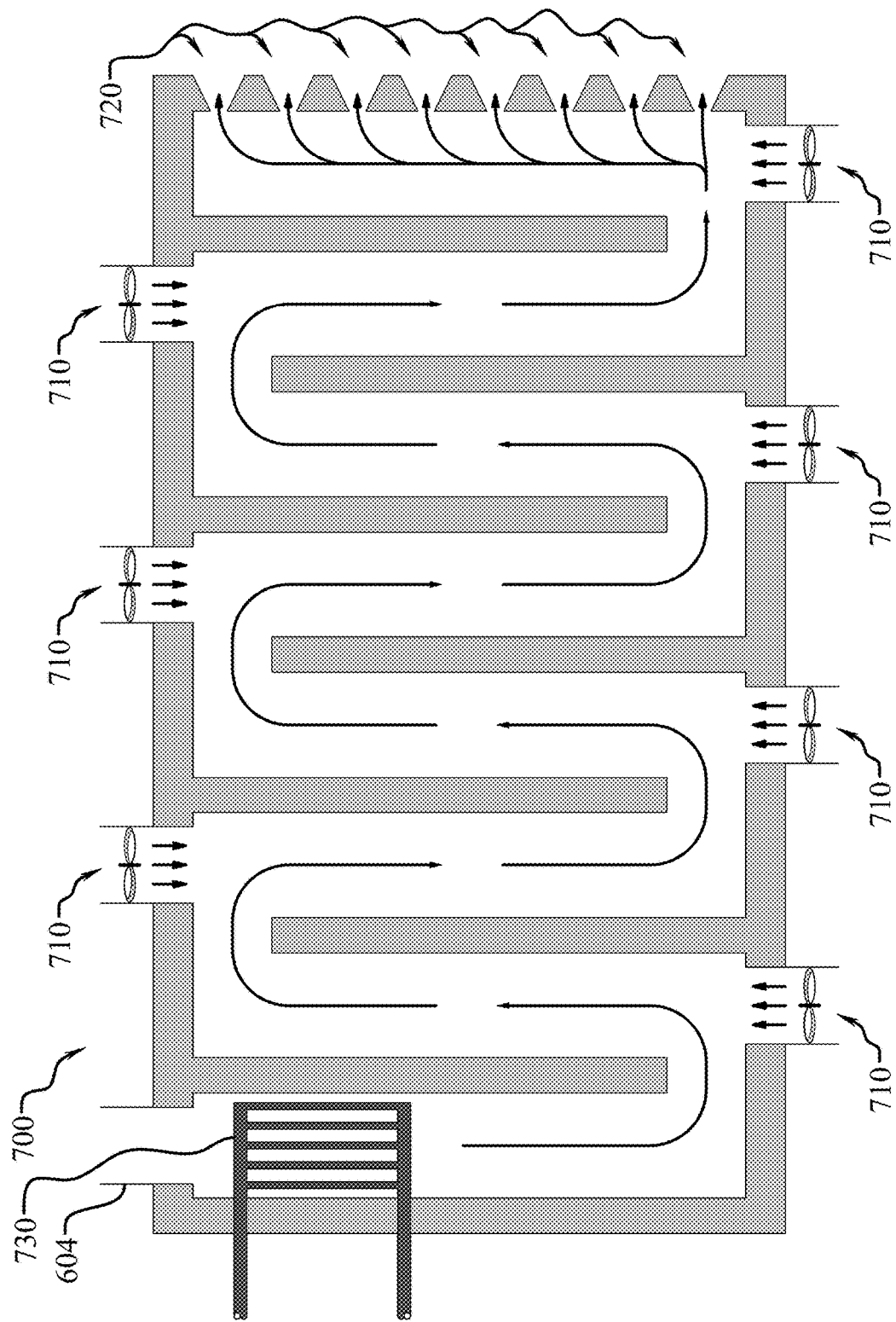
FIG. 11 is a schematic, in top plan view of a section, of an embodiment of a diffusion chamber of the present invention.

In another embodiment, the diffusion chamber (700) utilizes a heat exchanger (730) to further cool the exhaust gases, seen in FIG. 11; further, a heat exchanger may also be incorporated in any of the gas handling systems. Economic efficiency of a power plant can be increased by capturing waste heat and using it to preheat the boiler water that is turned into steam. As a result, the exhaust gases are further cooled and have lower local environmental heating which may adversely impact the environment. In one particular embodiment at least a portion of the diffusion chamber (700) is below ground to aid in cooling the exhaust gas, while in a further embodiment majority of the diffusion chamber (700) is below ground.

After the exhaust gas has been sufficiently clean, diluted and cooled to meet NAAQS standards, the gas is released into the atmosphere. In order to sequester carbon dioxide being released from the diffusion chamber (700), vegetation that has high carbon dioxide absorption capabilities may be planted around, or within, the diffusion chamber (700). For example, common horse-chestnut, black walnut, American sweetgum, *ponderosa* pine, red pine, white pine, London plane, Hispaniola pine, Douglas fir, scarlet oak, red oak, Virginia live oak, bald cypress, bamboo and hemp readily absorb and store carbon dioxide. The vegetation also provides an added benefit of noise attenuation. Carbon sequestration can be enhanced by using a diffusion chamber (700) instead of an exhaust stack because it releases carbon dioxide ($CO_2$) at ground level near the carbon dioxide ($CO_2$) absorbing vegetation, unlike an exhaust stack which releases it high in the atmosphere. Alternatively, the processed exhaust gas leaving the mixing tank (300) may be routed via the second gas handling system (600) to an onsite cooling tower, as seen in FIG. 3. The present system and method achieves the stated goal without the use of filters or collection plates, both of which require continuous maintenance.

Numerous alterations, modifications, and variations of the preferred embodiments disclosed herein will be apparent to those skilled in the art and they are all anticipated and contemplated to be within the spirit and scope of the disclosed specification. For example, although specific embodiments have been described in detail, those with skill in the art will understand that the preceding embodiments and variations can be modified to incorporate various types of substitute and or additional or alternative materials, relative arrangement of elements, order of steps and additional steps, and dimensional configurations. Accordingly, even though only few variations of the method and products are described herein, it is to be understood that the practice of such additional modifications and variations and the equivalents thereof, are within the spirit and scope of the method and products as defined in the following claims. Further, steps within a method using the language "the step of maintaining" or "monitoring" are not to be construed as automatically adjusting to achieve a specified value, range, or relationship, but rather may be achieved, and within the scope of the claims, solely due to the design of the structure, components, or attributes thereof. The corresponding structures, materials, acts, and equivalents of all means or step plus function elements in the claims below are intended to include any structure, material, or acts for performing the functions in combination with other claimed elements as specifically claimed.

We claim:

1. A method for reduction of particulate and contaminants from exhaust gas comprising:
   a) conveying unprocessed exhaust gas, at an unprocessed exhaust gas temperature, from a source (100) to a mixing tank (300), containing a system fluid, via a first gas handling system (200) having a first gas handling system flowrate, a first GHS inlet (202) in communication with the source (100), and a first GHS outlet (204) in communication with a mixing system (400), wherein the mixing system (400) mixes the unprocessed exhaust gas and the system fluid, while agitating the system fluid, wherein:
      i) the mixing tank (300) has a mixing tank liquid volume of at least 0.1 gallon per CFM of the first gas handling system flowrate, and a mixing tank gas volume of at least 0.013 cubic feet per CFM of the first gas handling system flowrate and at least 50% of the mixing tank liquid volume;
      ii) the mixing system (400) includes a mixing pump (410) having a mixing pump flowrate, an inlet, and an outlet, wherein the inlet receives a mixture of both unprocessed exhaust gas from the first gas handling system (200) and system fluid of the mixing tank (300), and the outlet is in fluid communication with the mixing tank (300);
      iii) the first gas handling system (200) includes a submerged GHS section (220) below the elevation of the system fluid, the submerged GHS section (220) includes a submerged GHS directional change of at least 45 degrees and contains an auxiliary flow channel (240) having (a) an auxiliary flow channel inlet (242) above the elevation of the system fluid, and (b) an auxiliary flow channel outlet (244) below the elevation of the system fluid, the submerged GHS section (220) having at least one orifice (480) allowing flow of system fluid from the mixing tank (300) into the submerged GHS section (220);

iv) further including the steps of drawing unprocessed exhaust gas through at least the auxiliary flow channel (240) and drawing system fluid through the at least one orifice (480), and mixing unprocessed exhaust gas and system fluid within the mixing pump (410) via a rotating pump impeller to create a mixed system fluid leaving the outlet with entrained gas and returning the mixed system fluid to the system fluid within the mixing tank (300);

b) conveying processed exhaust gas at a processed exhaust gas temperature that is less than 75% of the unprocessed exhaust gas temperature, from the mixing tank (300) to a diffusion chamber (700) via a second gas handling system (600) having a second GHS inlet (602) in communication with the mixing tank (300), and a second GHS outlet (604) in communication with the diffusion chamber (700);

c) mixing the processed exhaust gas with fresh atmospheric air, having a fresh air flowrate, in the diffusion chamber (700) to create a discharge gas having a discharge gas temperature below 300 degrees Fahrenheit and less than 40% of the unprocessed exhaust gas temperature; and d) releasing the discharge gas from the diffusion chamber (700).

2. The method of claim 1, wherein the auxiliary flow channel (240) includes an auxiliary flow channel directional change (246) of at least 30 degrees.

3. The method of claim 2, wherein the step of drawing unprocessed exhaust gas through the auxiliary flow channel (240) further includes changing the direction of flow at least 90 degrees before exiting the auxiliary flow channel outlet (244).

4. The method of claim 1, wherein the mixing tank liquid volume is circulated at least once every hour.

5. The method of claim 4, further including the step of maintaining the mixing tank liquid volume to no more than 5.0 gallons per CFM of the maximum first gas handling system flowrate.

6. The method of claim 1, further including the step of maintaining the mixing tank gas volume to be greater than the mixing tank liquid volume.

7. The method of claim 6, further including the step of maintaining the mixing tank gas volume to no more than twice the mixing tank liquid volume.

8. The method of claim 1, further including the step of maintaining the maximum mixing pump flowrate at 0.5-50 GPM per CFM of the maximum first gas handling system flowrate.

9. The method of claim 1, further including the step of maintaining the mixed system fluid to contain 6-30% exhaust gas entrained in the mixed system fluid.

10. The method of claim 1, wherein the diffusion chamber volume is at least 1 cubic foot per CFM of the fresh air flowrate and at least 1 cubic foot per CFM of the first gas handling system flowrate.

11. The method of claim 1, further including the step of automatically adjusting the amount of unprocessed exhaust gas drawn through at least the auxiliary flow channel (240) to achieve a target percentage of entrained gas within the mixed system fluid.

12. The method of claim 1, further including the step of automatically adjusting the amount of system fluid drawn through the at least one orifice (480) to achieve a target percentage of entrained gas within the mixed system fluid.

13. The method of claim 1, wherein the first gas handling system (200) enters the mixing tank (300) above an elevation of the system fluid.

14. The method of claim 1, wherein the at least one orifice (480) has an orifice open area of 0.025-0.09 square inches per GPM of the mixing pump flowrate.

15. The method of claim 1, wherein the step of mixing unprocessed exhaust gas and system fluid within the mixing pump (410) produces an average bubble size of the entrained exhaust gas of less than 100 μm.

16. A method for reduction of particulate and contaminants from exhaust gas comprising:

a) conveying unprocessed exhaust gas, at an unprocessed exhaust gas temperature, from a source (100) to a mixing tank (300), containing a system fluid, via a first gas handling system (200) having a first gas handling system flowrate, a first GHS inlet (202) in communication with the source (100), and a first GHS outlet (204) in communication with a mixing system (400), wherein the mixing system (400) mixes the unprocessed exhaust gas and the system fluid, while agitating the system fluid, wherein:

i) the mixing tank (300) has a mixing tank liquid volume of at least 0.1 gallon per CFM of the first gas handling system flowrate, and a mixing tank gas volume of at least 0.013 cubic feet per CFM of the first gas handling system flowrate and at least 50% of the mixing tank liquid volume, and further including the step of maintaining the mixing tank gas volume to be greater than the mixing tank liquid volume;

ii) the mixing system (400) includes a mixing pump (410) having a mixing pump flowrate of at least 0.5 GPM per CFM of the maximum first gas handling system flowrate, an inlet, and an outlet, wherein the inlet receives a mixture of both unprocessed exhaust gas from the first gas handling system (200) and system fluid of the mixing tank (300), the outlet is in fluid communication with the mixing tank (300), and the mixing pump (410) circulates the mixing tank liquid volume at least once every hour;

iii) the first gas handling system (200) includes a submerged GHS section (220) below the elevation of the system fluid, the submerged GHS section (220) includes a submerged GHS directional change of at least 45 degrees and has at least one orifice (480) allowing flow of system fluid from the mixing tank (300) into the submerged GHS section (220);

iv) further including the steps of drawing unprocessed exhaust gas through at least the submerged GHS section (220) and drawing system fluid through the at least one orifice (480), and mixing unprocessed exhaust gas and system fluid within the mixing pump (410) via a rotating pump impeller to create a mixed system fluid leaving the outlet with entrained gas and returning the mixed system fluid to the system fluid within the mixing tank (300);

b) conveying processed exhaust gas at a processed exhaust gas temperature that is less than 75% of the unprocessed exhaust gas temperature, from the mixing tank (300) to a diffusion chamber (700) via a second gas handling system (600) having a second GHS inlet (602) in communication with the mixing tank (300), and a second GHS outlet (604) in communication with the diffusion chamber (700); and c) mixing the processed exhaust gas with fresh atmospheric air, having a fresh air flowrate, in the diffusion chamber (700) to create a discharge gas having a discharge gas temperature less than 40% of the unprocessed exhaust gas temperature.

17. The method of claim 16, wherein the submerged GHS section (220) includes a submerged GHS directional change of at least 90 degrees.

18. The method of claim 16, further including the step of maintaining the mixing tank liquid volume to no more than 5.0 gallons per CFM of the maximum first gas handling system flowrate.

19. The method of claim 16, further including the step of maintaining the mixing tank gas volume to no more than twice the mixing tank liquid volume.

20. The method of claim 16, further including the step of maintaining the mixed system fluid to contain 6-30% exhaust gas entrained in the mixed system fluid, and wherein the step of mixing unprocessed exhaust gas and system fluid within the mixing pump (410) produces an average bubble size of the entrained exhaust gas of less than 100 µm.

\* \* \* \* \*